(12) United States Patent
Gurkan et al.

(10) Patent No.: US 10,491,390 B2
(45) Date of Patent: Nov. 26, 2019

(54) PROOF CHAINING AND DECOMPOSITION

(71) Applicant: QED-it Systems Ltd., Tel Aviv (IL)

(72) Inventors: Yakov Gurkan, Tel Aviv (IL); Shahaf Nacson, Tel Aviv (IL); Daniel Messod Benarroch Guenun, Tel Aviv (IL); Aviv Zohar, Jerusalem (IL); Jonathan Sullum Rouach, Tel Aviv (IL)

(73) Assignee: QED-IT SYSTEMS LTD., Tel Aviv-Jaffa (IL)

( * ) Notice: Subject to any disclaimer, the term of this patent is extended or adjusted under 35 U.S.C. 154(b) by 0 days.

(21) Appl. No.: 16/251,336

(22) Filed: Jan. 18, 2019

(65) Prior Publication Data
US 2019/0229919 A1    Jul. 25, 2019

Related U.S. Application Data

(60) Provisional application No. 62/636,402, filed on Feb. 28, 2018, provisional application No. 62/619,660, filed on Jan. 19, 2018.

(51) Int. Cl.
| | |
|---|---|
| *H04L 9/00* | (2006.01) |
| *H04L 9/32* | (2006.01) |
| *H04L 9/06* | (2006.01) |
| *H04L 9/08* | (2006.01) |

(52) U.S. Cl.
CPC .......... *H04L 9/3218* (2013.01); *H04L 9/0637* (2013.01); *H04L 9/0643* (2013.01); *H04L 9/0869* (2013.01); *H04L 9/3236* (2013.01); *H04L 2209/38* (2013.01)

(58) Field of Classification Search
CPC ..................................................... H04L 9/3218
See application file for complete search history.

(56) References Cited

U.S. PATENT DOCUMENTS

| | | |
|---|---|---|
| 2008/0076525 A1 | 3/2008 | Kim |
| 2009/0262928 A1 | 10/2009 | Busari |
| 2012/0235819 A1 | 9/2012 | Watkins |
| 2014/0211937 A1 | 7/2014 | Coric et al. |

(Continued)

OTHER PUBLICATIONS

Ben-Sasson, et al., Succinct Non-Interactive Zero Knowledge for a von Neumann Architecture, Proceedings of the $23^{rd}$ USENIX Security Symposium (Aug. 2014), pp. 781-796; 17 pages.

(Continued)

*Primary Examiner* — Josnel Jeudy
(74) *Attorney, Agent, or Firm* — Sterne, Kessler, Goldstein & Fox P.L.L.C.

(57) ABSTRACT

Disclosed herein are system, method, and computer program product embodiments for generating and chaining zero-knowledge proofs ("ZKPs") using proof chaining. A proof may be divided into different components to analyze data in a series and/or parallel manner using chained proof systems. The proof systems may generate hash values indicating that particular functions were applied to the instances of the underlying data. The hash values may prove that a particular function was applied to instances of the underlying data. Using the proof chaining configuration, a data supply system may generate a ZKP allowing a data requesting system to trust a function result without needing to receive the underlying data.

20 Claims, 12 Drawing Sheets

(56) References Cited

U.S. PATENT DOCUMENTS

| | | |
|---|---|---|
| 2014/0298038 A1 | 10/2014 | Gauravaram |
| 2015/0020158 A1 | 1/2015 | Kruglick |
| 2016/0087792 A1 | 3/2016 | Smith et al. |
| 2016/0225340 A1 | 8/2016 | Kim et al. |
| 2017/0013451 A1 | 1/2017 | Miao et al. |
| 2017/0063827 A1 | 3/2017 | Ricardo |
| 2017/0147673 A1 | 5/2017 | Burdick et al. |
| 2017/0154273 A1 | 6/2017 | Guttmann |
| 2017/0264430 A1 | 9/2017 | Robertson |
| 2017/0357496 A1 | 12/2017 | Smith et al. |
| 2018/0024813 A1 | 1/2018 | Naito et al. |
| 2018/0046436 A1 | 2/2018 | Lu |
| 2018/0123788 A1 | 5/2018 | Moon et al. |
| 2018/0276069 A1 | 9/2018 | Takayama |
| 2018/0285217 A1* | 10/2018 | Smith ................ G06F 11/1489 |
| 2018/0300108 A1 | 10/2018 | Goldman et al. |

OTHER PUBLICATIONS

Ben-Sasson, et al., Succinct Non-interactive Arguments for a von Neumann Architecture, Dec. 30, 2013 version, available at http://cs.tau.ac.il/~tromer/papers/vnsnark-20131230.pdf; 35 pages.

Ben-Sasson et al., Succinct Non-Interactive Zero Knowledge for a von Neumann Architecture [BCTV14a], last revised Feb. 5, 2019 (updated version), available at https://eprint.iacr.org/2013/879; 37 pages.

Ben-Sasson et al., Scalable Zero Knowledge via Cycles of Elliptic Curves, Advances in Cryptology—CRYPTO (2014), Lecture Notes in Computer Science, vol. 8617, pp. 276-294; 19 pages.

Ben-Sasson et al., Scalable Zero Knowledge via Cycles of Elliptic Curves, Algorithmica (2017), vol. 79, issue 4, pp. 1102-1160; 59 pages.

Ben-Sasson et al., Scalable Zero Knowledge via Cycles of Elliptic Curves [BCTV14b], Apr. 28, 2015 (extended version), available at https://eprint.iacr.org/2014/595; 47 pages.

Ben-Sasson et al., Secure Sampling of Public Parameters for Succinct Zero Knowledge Proofs, IEEE Symposium on Security and Privacy (2015), pp. 287-304; 18 pages.

Abdolmaleki et al., A subversion-resistant SNARK, Advances in Cryptology—ASIACRYPT (Dec. 2017), Lecture Notes in Computer Science, vol. 10626, pp. 3-33; 31 pages.

Abdolmaleki et al., A subversion-resistant SNARK [ABLZ17], May 26, 2017, available at https://eprint.iacr.org/2017/599; 36 pages.

Chiesa et al., Cluster Computing in Zero Knowledge, Advances in Cryptology—EUROCRYPT (2015), Lecture Notes in Computer Science, vol. 9057, pp. 371-403; 33 pages.

Chiesa et al., Cluster Computing in Zero Knowledge [CTV15], last revised Apr. 28, 2015 (extended version), available at https://eprint.iacr.org/2015/377; 42 pages.

Bowe et al., A multi-party protocol for constructing the public parameters of the Pinocchio zk-SNARK, Financial Cryptography and Data Security (Mar. 2018), Lecture Notes in Computer Science, vol. 10958, pp. 64-77; 14 pages.

Bowe et al., A multi-party protocol for constructing the public parameters of the Pinocchio zk-SNARK [BGG17], last revised Jun. 25, 2017, available at https://eprint.iacr.org/2017/602; 25 pages.

Bowe et al., A multi-party protocol for constructing the public parameters of the Pinocchio zk-SNARK (2017), available at https://www.semanticscholar.org/paper/A-Multi-party-Protocol-for-Constructing-the-Public-Bowe-Gabizon/90daebb07e88efed0ecfd09360cd239e350f6db4; 26 pages.

Schnorr, Efficient Identification and Signatures for Smart Cards, Advances in Cryptology—CRYPTO (1989), Lecture Notes in Computer Science, vol. 435, pp. 239-252; 14 pages.

Schnorr, Efficient Signature Generation by Smart Cards, Journal of Cryptology (1991), vol. 4, pp. 161-174; 14 pages.

Gennaro et al., Quadratic Span Programs and Succinct NIZKs without PCPs, Advances in Cryptology—EUROCRYPT (2013), Lecture Notes in Computer Science, vol. 7881, pp. 626-645; 20 pages.

Gennaro et al., Quadratic Span Programs and Succinct NIZKs without PCPs [GGPR13], last revised Jun. 18, 2012 (full version), available at https://eprint.iacr.org/2012/215; 59 pages.

Parno et al., Pinocchio: Nearly Practical Verifiable Computation, IEEE Symposium on Security and Privacy (2013), pp. 238-252; 15 pages.

Parno et al., Pinocchio: Nearly Practical Verifiable Computation [PGHR13], May 13, 2013, available at https://eprint.iacr.org/2013/279; 16 pages.

Parno et al., Pinocchio: Nearly Practical Verifiable Computation, Communications of the ACM (Feb. 2016), vol. 59, issue 2, pp. 103-112; 10 pages.

Fuchsbauer, Subversion-Zero-Knowledge SNARKS, Public-Key Cryptography—PKC (Mar. 2018), Lecture Notes in Computer Science, vol. 10769, pp. 315-347; 35 pages.

Fuchsbauer, Subversion-zero-knowledge SNARKS [Fuc17], last revised Jan. 11, 2018, available at https://eprint.iacr.org/2017/587; 32 pages.

Campanelli et al., Zero-knowledge Contingent Payments Revisited: Attacks and Payments for Services, Communications of the ACM (2017), pp. 229-243; 15 pages.

Campanelli et al., Zero-knowledge contingent payments revisited: Attacks and payments for services [CGGN17], last revised Nov. 1, 2017, available at https://eprint.iacr.org/2017/566; 28 pages.

Bitansky et al., Recursive Composition and Bootstrapping for SNARKs and Proof-Carrying Data, Proceedings of the ACM Symposium on Theory of Computing (STOC) (2013), pp. 111-120; 10 pages.

Bitansky et al., Recursive Composition and Bootstrapping for SNARKs and Proof-Carrying Data, Feb. 23, 2012 version, available at: https://www.tau.ac.il/~tromer/papers/bootsnark-20120224.pdf; 66 pages.

Bitansky et al., Recursive Composition and Bootstrapping for SNARKs and Proof-Carrying Data, Apr. 3, 2012 version, available at: http://citeseerx.ist.psu.edu/viewdoc/download?doi=10.1.1.259.8525&rep=rep1&type=pdf; 68 pages.

Bitansky et al., Recursive Composition and Bootstrapping for SNARKs and Proof-Carrying Data [BCCT13], last revised Dec. 28, 2012, available at https://eprint.iacr.org/2012/095; 61 pages.

* cited by examiner

PROOF CHAINING AND DECOMPOSITION

CROSS-REFERENCE TO RELATED APPLICATIONS

This application claims the benefit of U.S. Provisional Patent Application No. 62/619,660 filed Jan. 19, 2018 and U.S. Provisional Patent Application No. 62/636,402 filed Feb. 28, 2018, the entirety of which is incorporated herein by reference.

BACKGROUND

Field

The present disclosure relates generally to cryptography, zero-knowledge proofs ("ZKPs"), and blockchain technology.

Related Art

When information or data is exchanged between parties, the question arises as to whether the exchanged information may be trusted. A party receiving the exchanged information may question whether the received information is truthful. For example, the party receiving the information may wish to verify that the received information is accurate and that the sending party has not fabricated false information. Further, the receiving party may wish to verify that a third-party has not tampered with the received information prior to receipt.

In some cases, the sending party may wish to deliver information to the receiving party without exposing private underlying data used to generate the information. For example, the sending party may wish to report an average temperature measurement but may not wish to expose the individual sensor measurements from each temperature sensor. In this manner, the sending party may wish to use a mechanism that proves that the reported average temperature measurement sent to the receiving party used all of the sensor measurements and also applied the proper formula for calculating the average. One way of ensuring privacy while verifying accuracy is using a ZKP.

In other words, a party may compute a function on data that it wants to keep confidential and share the result of the function with another party. The ZKP allows a party to verify that the function was properly applied to the data, without having to share the data itself. This allows the other party to verify the integrity of the function and the accuracy of the result without knowing the underlying data.

One example of a ZKP is the zero-knowledge succinct non-interactive argument of knowledge ("zk-SNARK"). The zk-SNARK scheme may use several algorithms including a set-up phase or key generation phase; a proving algorithm; and a verification algorithm. The set-up phase may generate a random string to generate a key and then subsequently destroy the string for security. The proving algorithm generates a proof that is relatively small in size. The size of the generated proof may be independent of the runtime of the program which results in the "succinct" naming convention. The verification algorithm may verify the proof relatively quickly in a time dependent on the size of the input and independent of the length of the computation.

The zk-SN ARK scheme may be useful because the succinct proofs may use relatively little memory space for a blockchain of proofs. Further, the relatively fast verification may allow multiple users that are observing the blockchain to quickly verify a large load of transactions.

The zk-SNARK cryptography may be described in the following three algorithms:
(1) (pk, vk)=SETUP(CS)
(2) ($\pi$)=PROVE(pk, public_data, private_data)
(3) (verified)=VERIFY(vk, $\pi$, public_data)

In these algorithms, "CS" represents a constraint system defining a non-probabilistic or nondeterministic polynomial statement. The constraint system may include the function sought to be proved. Public_data may be the result of the function and private_data may be the underlying data that should remain confidential. In the example above, public_data may be the average temperature measurement, and the private_data may be the individual temperature sensor values.

The SETUP algorithm generates a proving key ("pk") and a verification key ("vk") based on the constraint system. The SETUP algorithm may require random numbers that must be kept secret to ensure that at the proof is properly and securely generated.

The PROVE algorithm generates a proof from the proving data, the public_data, and the private data. The symbol $\pi$ may represent the proof itself generated using the proving key as well as public data and private data. In some implementations, the proof $\pi$ may be only 300 bytes long. zk-SNARK may have the benefit of proving a succinct proof, regardless of the complexity of the underlying function.

The VERIFY algorithm uses the vk and the proof, $\pi$, to verify the correctness of the public data. The VERIFY algorithm may return a binary one or zero value indicating whether or not the public data is correct.

While useful, zk-SNARK may have some drawbacks. For example, the random string used in the SETUP may need to be destroyed to prevent users from generating proofs that attest to false computations. For this reason, the set-up phase is sensitive to potential errors. The set-up phase is specific to the computation and may be re-done if the computation is changed. The key sizes may depend on the length of the computation and may be prohibitive for long computations. Also, the security of the zk-SNARK scheme may depend on cryptographic assumptions that increase complexity relative to more common assumptions, such as the "knowledge-of-exponent" assumption.

In addition, the PROVE algorithm may be very computationally intensive. The run-time of the PROVE algorithm may relate to the number of steps in the underlying function sought to be verified. As an illustrative example, in one computer system, generating a proof with a function involving 1,000 steps may take 1 second. As the number of inputs in private_data increases, so does the length of time to execute the PROVE algorithm may increase. One thousand steps may be a relatively small amount. Many computer operations may involve millions of steps. Generating a proof for complex functions may require extensive processing time and computing resources, and be overly burdensome.

Compounding the burdensome computations. To generate a proof, all of the private_data must be known in advance. In some applications, new private_data, and hence new public_data, may be generated all the time. In that case, a new proof, using both the old private_data and new private_data, has to be regenerated to verify the new public_data.

New systems and methods are needed that are computationally efficient when generating a proof based on a large amount of underlying data. Also, new methods and systems are needed that may easily allow for the addition of subsequent data points while maintaining cryptographic security.

BRIEF SUMMARY

Disclosed herein are system, method, and computer program product embodiments for generating and chaining zero-knowledge proofs ("ZKPs") using proof chaining. A proof may be divided into different components to analyze data in a series and/or parallel manner using chained proof systems, A proof system may include one or more logical circuits or logic systems. The proof systems may generate hash values (also referred to as glue values) indicating that particular functions were applied to the instances of the underlying data. The hash values may prove that a particular function was applied to instances of the underlying data. Using the proof chaining configuration, a data supply system may generate a ZKP allowing a data requesting system to trust a function result without needing to receive the underlying data.

In an embodiment, a system for generating a proof in a chain of proofs may comprise a memory and at least one processor coupled to the memory. The at least one processor may be configured to receive a first function result generated based on a first underlying data. The at least one processor may also be configured to receive a first proof that verifies the accuracy of the first function result without needing to reveal the first underlying data. The at least one processor may also be configured to receive a first value derived from a one-way cryptographic operation performed using the first function result and/or a two-way encryption operation performed using the first function result and/or a multi-way encryption operation performed using the first function result. The at least one processor may be further configured to receive the first function result, the first proof, and the first value from a preceding proof system. The at least one processor may be further configured to evaluate a second function result based at least in part on the first function result and a second underlying data. The at least one processor may be further configured to generate a second value based on the second function result using another one-way cryptographic operation and/or another two-way encryption operation and/or another multi-way encryption operation. The at least one processor may be further configured to generate a second proof based on the second value such that the second proof enables a verification of accuracy of the second function result without needing to reveal the second underlying data. The at least one processor may be further configured to publish the second proof and the second value.

In some embodiments, a computer-implemented method for generating a proof in a chain of proofs may comprise receiving a first function result generated based on a first underlying data. The computer-implemented method may also comprise receiving a first proof that verifies the accuracy of the first function result without needing to reveal the first underlying data. The computer-implemented method may also comprise receiving a first value derived from a one-way cryptographic operation performed using the first function result and/or a two-way encryption operation performed using the first function result and/or a multi-way encryption operation performed using the first function result. The computer-implemented method may further comprise receiving the first function result, the first proof, and the first value from a preceding proof system. The computer-implemented method may further comprise evaluating a second function result based at least in part on the first function result and a second underlying data. The computer-implemented method may further comprise generating a second value based on the second function result using another one-way cryptographic operation and/or another two-way encryption operation and/or another multi-way encryption operation. The computer-implemented method may further comprise generating a second proof based on the second value such that the second proof enables a verification of accuracy of the second function result without needing to reveal the second underlying data. The computer-implemented method may further comprise publishing the second proof and the second value. In some examples, the computer-implemented method may comprise iteratively verifying the first proof and the second proof using the glue values.

In some embodiments, a non-transitory computer-readable device is disclosed, the non-transitory computer-readable device may have instructions stored thereon that, when executed by at least one computing device, may cause the at least one computing device to perform the computer-implemented method described above.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identities the drawing in which the reference number first appears.

DETAILED DESCRIPTION

Figure 1A:
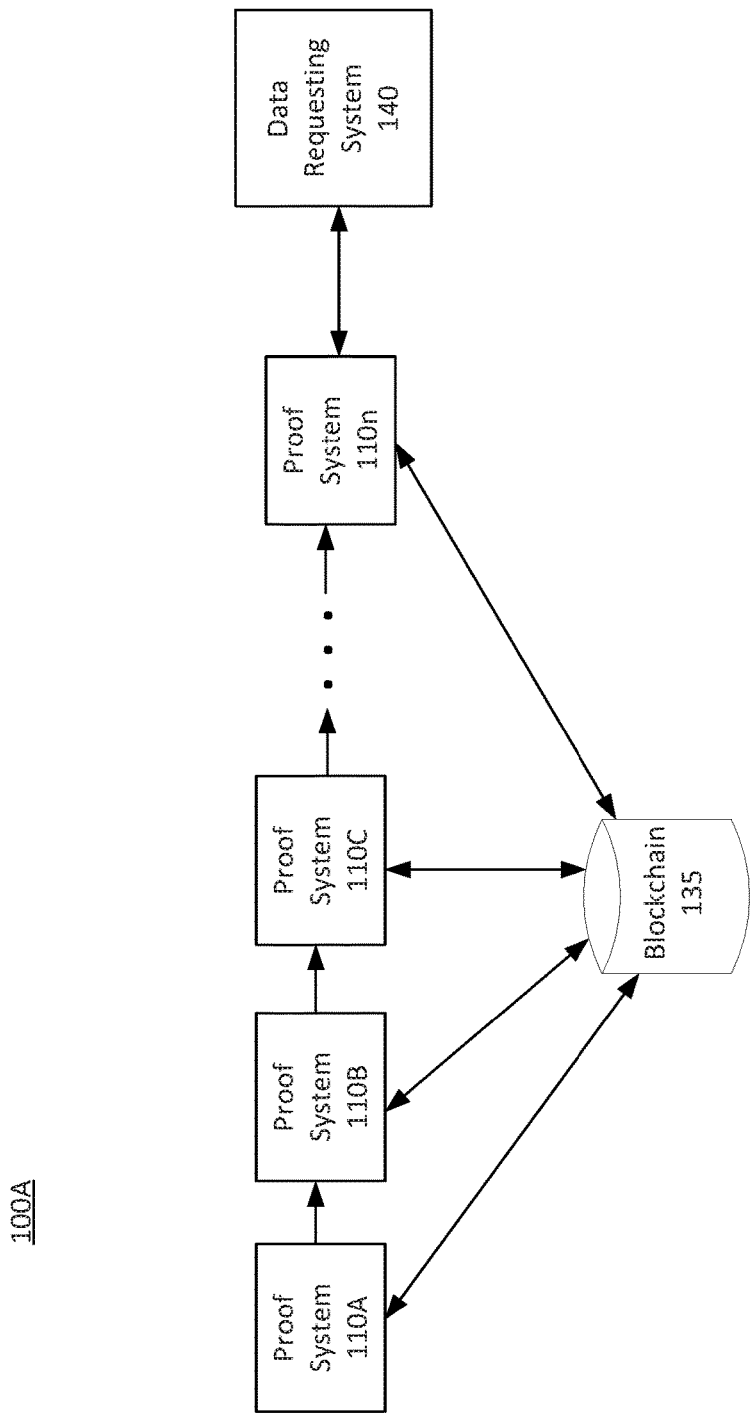
FIG. 1A depicts a block diagram of a serial proof chaining configuration, according to some embodiments.

Provided herein are system, apparatus, device, method and/or computer program product embodiments, and/or combinations and sub-combinations thereof, for chaining zero-knowledge proofs ("ZKPs"). In particular, this disclosure describes proof chaining to improve the zk-SNARK scheme as well as to provide a method for generating ZKPs. Proof chaining may allow for multiple proving processes to occur. This division of the proving process may allow for multiple parallel processes to generate proofs. Further, the proof chaining may allow proofs to be generated at different sources of underlying data.

This proof chaining may use glue values representing hash values passed between proof systems. These glue values may maintain the verification and attestation of each chained proof while also preserving the ZKP nature of the underlying calculations. In this manner, the glue values may represent proof of the applied function or calculation. In an embodiment, a first proof system may perform a first calculation on underlying private data to generate a function result. The first proof system may then generate a glue value using a hash operation applied to the function result and a random number. The first proof system may then pass this glue value to a second proof system.

The second proof system may receive the function result from the first proof system as well as the glue value. In an embodiment, the function result received may be unprocessed data if processing has not been performed initially at the first proof system. In an embodiment, the function result and/or the glue value may be received privately and/or via a block committed to a blockchain.

Upon receiving the function result and the glue value, the second proof system may apply a function to the function result received from the first proof system along with secondary data provided by the second proof system. This application may represent the second proof system providing additional data and/or updating the function result along with updating the glue value.

For example, in the context of a credit score, the first proof system may have analyzed first transaction data to calculate a first instance of the credit score. The first proof system may also generate a glue value representing a hash of the first instance of the credit score with a random number. The first proof system may then pass the first instance to the second proof system along with the glue value. Upon receiving the first instance and the glue value, the second proof system may identify second transaction data. The second proof system may then apply the credit score function to the second transaction data as well as the first instance of the credit score. In this manner, the second proof system may generate an updated credit score calculation. The second proof system may also perform a hash operation on the updated credit score calculation with a random number to generate a second glue value. The second proof system may publish this second glue value and/or update credit score to a blockchain. This process may continue if other proof systems are configured to continue processing additional data. If the identified data has been processed, the second proof system may identify the updated credit score as the representative credit score based on the identified data.

In view of this process, the second proof system may generate an updated credit score without viewing or accessing the underlying data processed by the first proof system. Further, the passing of glue values between proof systems may preserve proof throughout the proof systems. The glue value scheme with proof chaining may be used in various configurations.

In another example in the context of a credit score, multiple entities may have access to different pieces of information relevant to a credit score. For example, a first entity may have access to a first transaction data, a second entity may have access to a second transaction data, a third entity may have access to a third transaction data, and so forth. Moreover, in some examples the second entity and/or the third entity may have no access to the first transaction data, the first entity and/or the third entity may have no access to the second transaction data, the first entity and/or the second entity may have no access to the third transaction data, and so forth. Some examples of the first, second and third entities may comprise a proof system, a computerized system, a financial entity, and so forth. In some examples, the first entity may analyze the first transaction data to calculate a first factor of the credit score and may also generate a first glue value representing a hash of the first factor of the credit score with a random number, the second entity may analyze the second transaction data to calculate a second factor of the credit score and may also generate a second glue value representing a hash of the second factor of the credit score with a second random number, the third entity may analyze the third transaction data to calculate a third factor of the credit score and may also generate a third glue value representing a hash of the third factor of the credit score with a third random number, and so forth. Further, any of first factor of the credit score, second factor of the credit score, third factor of the credit score, etc., and/or any of the first glue value, the second glue value, the third glue value, etc., may be published on a blockchain, transmitted to a computerized device using a communication network, posted on a web server, stored in memory, provided to another entity, and so forth. Following, a credit score may be calculated using the factors of the credit score (the first factor of the credit score, second factor of the credit score, third factor of the credit score, etc.), for example by another entity, by another proof system, and so forth. For example, a proof system may calculate a credit score using the factors of the credit score (first factor of the credit score, second factor of the credit score, third factor of the credit score, etc.), and in some examples a ZKP of the calculation of the credit score may be generated using the factors of the credit score and/or the glue values (the first glue value, the second glue value, the third glue value, etc.), for example as described above. The calculated credit score and/or the ZKP of the calculation of the credit score may be published on a blockchain, transmitted to a computerized device using a communication network, posted on a web server, stored in memory, provided to another entity, and so forth.

For example, the proof systems may be arranged in a serial configuration and/or a parallel configuration. In a serial configuration, the proof systems may pass function results and/or glue values between proof systems. The different proof systems may analyze different sets of information or different transaction data. The serial configuration may also generate a rolling hash that may carry throughout the proof systems. This configuration may allow for proving that transaction data from a set has been applied. In this manner, the rolling nature of the glue values may generate a chain of hash values indicating that the data from a set have been considered and used. Upon verification of the hash values, a verifier system may confirm that the individual rolling glue values generated by each proof system. This process allows for a verification of the proof as well as an indication of the utilization of the data from a set.

The glue value process may also allow for parallel processing when proof systems are configured in a parallel configuration. In this configuration, the processing may be performed in a faster manner as multiple proofs may be performed in parallel. The different proof systems may each generate glue values. The glue values may then be transmitted to a data requesting system and/or another proof system that may collect the glue values. The collecting proof system may perform another hash representing the multiple parallel proof systems. In this manner, the parallel generation of the proofs may increase the speed of processing.

While the above examples have been described with reference to generating a credit score, the embodiments described in this disclosure are not limited to that example embodiment. The ZKP scheme as well as the proof chaining may be applied to other types of data as well as other types of functions or algorithms. For example, the data may be sensor data such as temperature readings from different temperature sensors. An algorithm may include calculating an average temperature reading. The individual readings may be underlying private data while the output of the proof system may be the average temperature. The glue value or hash value may be used as the proof that the proof systems applied the algorithm and included the individual temperature sensors readings. The algorithm may also calculate other statistical measures such as a summation, average, or variance. Other sensor measurements may include audio captured by a microphone or images captured using an image sensor.

Similarly, the ZKP scheme and/or proof chaining may be applied to certification systems. For example, a potential employee candidate may provide proof of credentials from various sources. For example, the candidate may provide a valid school transcript, proof of a grade point average, a university ranking, and/or other information depending on the requesting employer. Via the use of blockchain technology, the proof chaining, and the ZKP scheme, the candidate may provide verifiable information to the employer. While these embodiments have been described, the ZKP scheme and proof chaining may be applied to various other cryptographic environments, blockchain environments, and/or other verifiable communication environments.

Figure 1B:
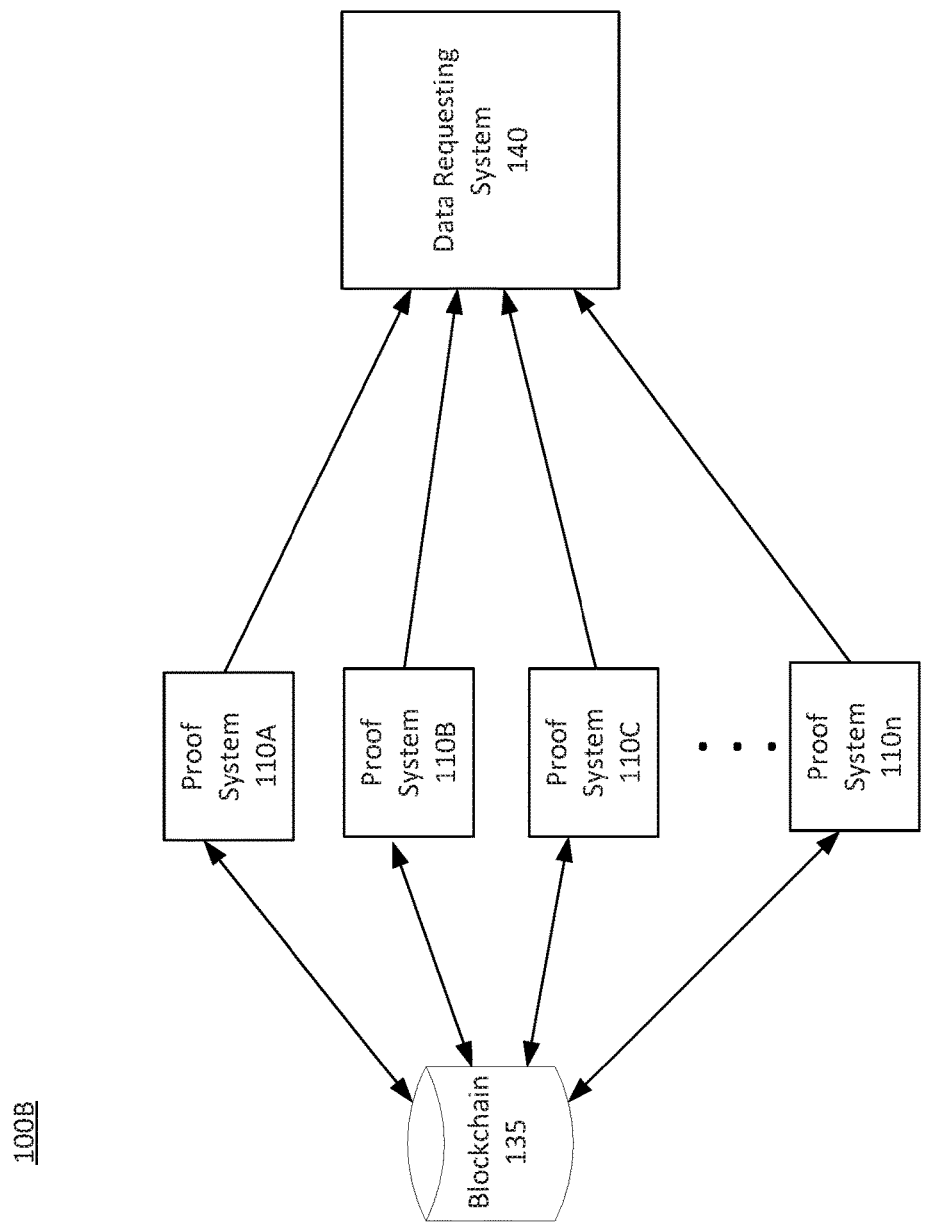
FIG. 1B depicts a block diagram of a parallel proof chaining configuration, according to some embodiments.
Figure 2:
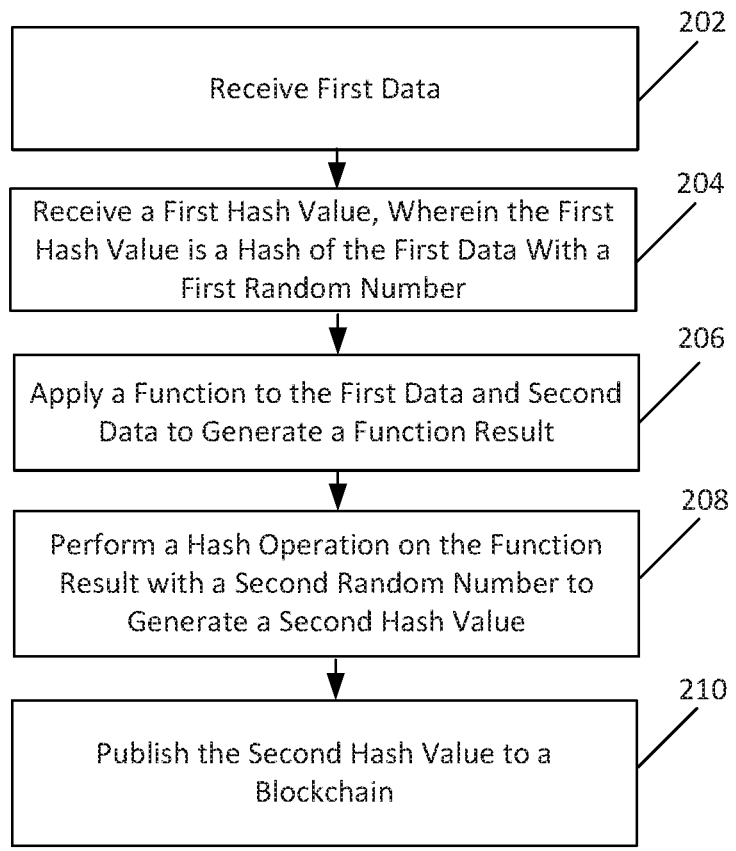
FIG. 2 depicts a flowchart illustrating a method for chaining proofs, according to some embodiments.

In the description that follows, the ZKP scheme and proof chaining schemes are described in greater detail with respect to FIGS. 1A-1B and 2. Then, an example blockchain embodiment is described with respect to FIGS. 3, 4, and 5.

FIG. 1A depicts a block diagram of a serial proof chaining configuration 100A, according to some embodiments. The proof chaining of one or more proof system 110 may allow for the division of a proving process and/or may allow for multiple parallel processes to generate proofs. Proof systems 110 may include one or more logical circuits or logic systems. Different sources of data may also be arranged in a proof chaining configuration so that proofs from the different sources may be compiled. In an embodiment, the proof chaining configuration may be used to generate proofs related to multiple instances of underlying transaction data. Each proof system 110 may generate a proof based on one or more instances of the underlying transaction data such that chain of proof system 110 processes a whole set of transaction data.

The proof systems 110 may individually access blockchain 135 to retrieve transaction data and/or may retrieve transaction data from disparate sources. In an embodiment, a system, such as data supply system 110, may retrieve information from blockchain 135 and/or from a local memory and supply the information to proof systems 110. In this case, data supply system 110 may act as a manager of the processing and generation of proofs from proof systems 110.

Using the proof chaining configuration may improve the zk-SNARK scheme and/or may provide a method for generating a ZKP. Proof chaining may allow for multiple proving processes to occur at the different proof systems 110. This division of the proving process may allow for multiple parallel processes to generate proofs. Further, the proof chaining may allow proofs to be generated at different sources of underlying data. In the zk-SNARK scheme, the proofs may be represented in the following manner:

$$(\pi)=\text{PROVE}(pk, public\_data, private\_data)$$

To perform the iterative calculation with multiple intermediary proofs, the proof may be represented as follows:

$$(\pi_i)=\text{PROVE}(pk, public\_data_i, private\_data_i)$$

In view of this divided processing and proof generation, the proof chaining may use "glue values" to connect the proof systems 110. A glue value may represent a hash value passed between proof systems 110. The glue values may maintain the verification and attestation of each chained proof while also preserving the ZKP nature of the underlying calculations. In this manner, the glue values may represent proof of the applied function or calculation.

In an embodiment, a particular proof system 110A may analyze data corresponding to the particular proof system 110A. For example, the data may be transaction data, sensor data, certificate data, and/or other data assigned to proof system 110A. Proof system 110A may apply a function to generate a function result corresponding to the data. Proof system 110A may also generate a glue value representing a hash of the function result with a random number. In this manner, proof system 110A may generate an intermediary data structure defined as "GLUE_PRIVATE" representing the random number and the function result. The function result is referred to as "CARRY_DATA" below. If proof system 110A is the initial proof system 110 and/or does not perform function processing, the function result may be the underlying transaction data. By performing a hashing operation on the "GLUE_PRIVATE," the particular proof system 110 may generate the glue value indicated in the "GLUE" definition recited below:

$$\text{GLUE\_PRIVATE}_i:=(\text{RANDOM}_i; \text{CARRY\_DATA}_i)$$

$$\text{GLUE}_i:=\text{HASH}(\text{GLUE\_PRIVATE}_i)$$

Finally, proof system 110A can generate a proof to allow a downstream user to verify the integrity of the function result. To generate a proof, $public\_data_i$ and $private\_data_i$ may be generated as set out below. Following, public data=(input=x; output=y) in PROVE means that x is an input required to compute the proof (e.g., a Sudoku puzzle) and y is a computed value that is a result of executing the circuit with its public and private inputs (e.g., the hash of the solution to the Sudoku puzzle). The same format is used for private data.

A proof may include several inputs and/or several outputs:

$$public\_data_i:=(input=\text{GLUE}_j;$$
$$input=\text{LINK\_PUBLIC\_DATA}_i; output=\text{GLUE}_i)$$

$$private\_data_i:=(input=\text{GLUE\_PRIVATE}_j;$$
$$input=\text{LINK\_PRIVATE\_DATA}_i;$$
$$output=\text{GLUE\_PRIVATE}_i)$$

LINK_PUBLIC_DATA$_i$ may denote the portion of public data that represents the business-logic related public inputs to a single link in the proof chain. By allowing new input=x values to be incorporated into the $public\_data_i$ and $private\_data_i$, new rules and business logic can be added. For example, the formula used to generate a credit score could change. In this manner, the function applied to the underlying data may change. LINK_PRIVATE_DATA$_i$ may denote the underlying data used by a particular proof system 110.

Proof system 110A may then pass the function result as well as the glue value to proof system 110B. Proof system 110B may then apply the function to the particular transaction data assigned to proof system 1108. For example, proof system 110B may update the credit score based on second transaction data. Proof system 110B may also generate a second glue value by performing a hash operation on the updated function result and another random number that may differ from the first random number.

In an embodiment, the second glue value may be a hash of the updated function result, another random number, and the first glue value. In this embodiment, the second glue value may perform a hash of the first glue value generating a second degree of hashing. In this case, the "CARRY_DATA$_i$," or function result may be defined in the following manner:

CARRY_DATA$_i$:=(CARRY_AVERAGE$_i$;CARRY_DATA_HASH$_i$)

Where the CARRY_DATA_HASH$_i$ may represent a glue value as seen from the following definition:

CARRY_DATA_HASH$_i$=HASH(CARRY_DATA_HASH$_{i-1}$;CHUNK$_i$))

CHUNK$_i$ may represent the data or batch elements corresponding to the particular proof system 110 or sensor processing the data at a particular iteration or list position. When a proof system 110 or sensor is initialized, the first instance of CARRY_DATA$_0$ may be defined as:

CARRY_DATA$_0$:=(0;HASH(0;CHUNK$_0$))

CHUNK$_0$ may be an initial value or seed value.

In view of these definitions, a proof system 110A may pass a function result, or CARRY_DATA, to a subsequent proof system 110B. Proof system 110A may also pass a glue value representing a hash value of the function result with a random number.

In this manner, proof system 110B may continue to apply the function to the function result as well as the transaction data maintained at proof system 110B. Proof system 110B may then generate a second glue value based on a hash of the updated function result with a random number. Optionally, proof system 110E may generate the second glue value based on a hash of the updated function result, a random number, and the first glue value. Proof system 110B may also generate a signed key proving the result. This process may continue until the transaction data from a set has been processed to generate a final function result and final glue value.

In an embodiment, proof system 110A may communicate with proof system 110B via a blockchain, such as blockchain 135. For example, proof system 110A may publish the glue values to blockchain 135 to commit public proof that proof system 110A performed the particular function with the assigned underlying transaction data. Proof system 110A, however, may not expose this underlying transaction data. Proof system 110A may also commit the function result to blockchain 135 to demonstrate the calculation. This function result may be in a hash form to prevent public access if desired. If more privacy is desired, the function result may be communicated privately from proof system 110A to proof system 110B without public exposure. Proof system 110B may then perform further processing without necessarily viewing the underlying transaction data used by proof system 110A. In this configuration, new transaction data and/or further processing may be easily added to the chain to continue to update function results.

After each proof system 110 updates the function result and generates glue values, a final proof system 110 may produce the final function result. For example, the final function result may be a credit score number after each instance of transaction data has been considered by each proof system 110. The final proof system 110 may then transmit the final function result to data requesting system 140 directly or via blockchain 135.

Regarding verification, a verifier may verify the proof. The verifier may be a proof system 110 and/or data requesting system 140. The verifier may use the following algorithm to verify the proof. The algorithm may include an iterative verification of each proof based on the glue values.

last_glue ← null
for all π$_i$, public_data$_i$ = (GLUE$_{i-1}$, LINK_PUBLIC_DATA$_i$, GLUE$_i$)
do
    verified ← VERIFY(vk$_i$, π$_i$, public_data$_i$)
    if verified ≠ true then
        return false
    end if
    if last_glue ≠ null & last_glue ≠ GLUE$_i$ then
        return false
    end if
    last_glue ← GLUE$_i$
end for
return true In an embodiment, the verifier may confirm that each proof or zk-SNARK proof is verified and that GLUE$_i$=GLUE$_{i-1}$.

FIG. 1B depicts a block diagram of a parallel proof chaining configuration 100B, according to some embodiments. Parallel proof chaining configuration 100B may include proof systems 110, blockchain 135, and/or data requesting system 140. Parallel proof chaining configuration 100B may include a configuration that may be non-homogenous and/or non-linear. This configuration may form a graph or a two-dimensional configuration. Through the use of parallelization of proof systems 110, the speed of the generation of proofs may be increased even if the size or the amount of underlying data is unknown in advance.

Proof systems 110 as described with reference to parallel proof chaining configuration 100B may operate in a manner similar to proof systems 110 as described with reference to serial proof chaining configuration 100A. Proof systems 110 may include one or more logical circuits or logic systems. Each proof system 110 may process one or more instances of transaction data. The transaction data may be retrieved from blockchain 135. Each proof system 110 may then apply a function or algorithm to the corresponding instance of transaction data. Each proof system may then generate a function result and/or a glue value. The individual glue value may represent a hash value of the function result with a random number. In this manner, proof systems 110 may process transaction data individually and/or in parallel. Further, the transaction data may be non-homogenous. In this manner, different types of data may be compiled while still providing proof of the validity of the data.

After proof systems 110 generate function results and/or glue values, the proof systems 110 may transmit the function results and/or glue values to data requesting system 140. These individual results may represent individual ZKPs corresponding to different data elements requested by data requesting system 140.

In an embodiment, to horizontally scale the proofs, parallel proof chaining configuration 100B may prepare a witness to generate the proofs. The witness may be a value generated for Non-deterministic Polynomial Time class, or NP, problems. The witness may allow the prover to prove to the validity of an NP statement to a verifier. Preparing a witness may be a preprocessing step in the setup of parallel proof chaining configuration 100B. The preprocessing may be a faster process than generating the proofs. After completing the witness preprocessing, the proofs may be generated in parallel. The same preprocessing may be applied to the verification of the proofs.

In an embodiment, proof systems 110 may transmit the function results and/or glue values to one or more end-proof systems 110 that compile the function results and/or glue values. The end-proof systems 110 may package and/or organize the data into a data package that may be transmitted to data requesting system 140. For example, a particular proof system 110B may receive a first glue value from proof system 110A and generate a second glue value based on the received first glue value. Proof system 110B may also receive a third glue value from proof system 110C. Using the second glue value and the third glue value, proof system 110B may generate a ZKP indicating that the application of the functions has been verified. Proof system 110B may then publish the ZKP to a blockchain.

While serial proof chaining configuration 100A and parallel proof chaining configuration 100B display proof systems 110 in their respective configurations, proof systems 110 may also be in a mixture of serial and parallel proofs. For example, one or more proof systems 110 may operate in a series while one or more other proof systems may operate in parallel. In either configuration, a larger proof may be decomposed into fixed and/or repeating parts even if the size of the proof (or the amount of transaction data) is unknown in advance. The modularity of the proof systems 110 may allow for flexibility of changing parts.

Proof systems 110 may also aid in distinguishing between proofs that include repeating parts and changing parts. For example, a certifying entity (such as a university, school, government agency, and/or other entities) may issue a certificate (such as an academic certificate, license, and/or other credential) to an entity (such as, a person, a company, or other entity). A third party (such as a recruiter, customer, client, or other third party) may wish to verify the authenticity of the certificate and/or perform a calculation related to the certificate. For example, the third party may wish to calculate a grade point average or another factor corresponding to employment condition. In this case, a repeating portion may include a process to prove the certificate was issued and published by the certifying entity. The changing part may include the answer to different queries from the third party such as (1) whether the certificate was issued by one of the top 5 universities; (2) is the grade point average over 3.8; or (3) is there a passing grade for the calculus class.

In this example, because the repeating portion of proving that the certificate was issued by a certifying authority may be repeated throughout the queries, a particular proof system 110A may be assigned to generate the proof for the repeating portion. Regarding the other three individual queries, three different proof systems 110B, 110C, and 110D may be assigned to generate proofs for the individual queries. In this configuration, proof system 110A may be placed in a serial communication with each of proof systems 110B, 110C, and 110D. For example, proof system 110A may generate a function result that designates that the certificate was issued. The function result may be an indicator that a logical test is true. Proof system 110A may then generate a glue value based on this function result using a hash with a random number. Proof system 110A may then pass the function result and the glue value to each of proof systems 110B, 110C, and 110D. Proof systems 110B, 110C, and 110D may then operate in parallel to perform their individual analyses.

In this manner, proof system 110 may be arranged in a serial and parallel manner. Other data types may also be considered with various different functions. Verification may be performed using the glue values generated by each proof system 110.

FIG. 2 depicts a flowchart illustrating a method 200 for chaining proofs, according to some embodiments. Method 200 shall be described with reference to FIG. 1A; however, method 200 is not limited to that example embodiment.

In an embodiment, a proof system 110 may utilize method 200 to generate a chain of proofs. While method 200 is described with reference to a proof system 110, method 200 may be executed on any computing device, such as, for example, the computer system described with reference to FIG. 11 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 2, as will be understood by a person of ordinary skill in the art.

At 202, a proof system 110 may receive first data. Depending on the location of proof system 110 in a chain of proof systems 110, first data may represent initialization data or a function result from a previous proof system. For example, proof system 110A may initialize with seed data representing the received first data. If proof system 110B is executing method 200, however, the first data may be received from proof system 110A. This first data may represent a function result determined by proof system 110A based on transaction data analyzed at proof system 110A.

At 204, the proof system 110 may receive a first hash value, wherein the first hash value is a hash of the first data with a first random number. The hash value may be a glue value as previously described. In this case, proof system 110B may receive the first glue value from a preceding proof system 110 such as proof system 110A. Proof system 110A may have generated the first glue value based on a hash of the first data with the first random number.

At 206, the proof system 110 may apply a function to the first data and second data to generate a function result. For proof system 110B, the second data may represent underlying transaction data assigned to proof system 110B. At 206, proof system 110B may apply a function to the first data received from proof system 110A and the second data to generate a function result. This function result may represent an updated version of a function applied at proof system 110A. For example, if the function applied by proof systems 110A and 110B is used to determine a credit score, proof system 110B may update the credit score using the second data. Similarly, if the function generates an average temperature reading from several temperature sensors, the first data may represent a first rolling average based on a first temperature measurement. At 206, proof system 110E may update the rolling average based on a second temperature measurement represented by the second data. In this case, the function result may be the average of the first and second temperature measurements. In an embodiment, the function and function result may include an algorithm configured to address different data types as previously discussed with reference to the mixed serial and parallel configuration scheme.

At 208, the proof system 110 may perform a hash operation on the function result with a second random number to generate a second hash value. This second hash value may be a second glue value. The second glue value may be used to verify the proof and the updated function result from proof system 1108. The hash operation may encrypt the second glue value.

At 210, the proof system may publish the second hash value to a blockchain 135. The second hash value may be a second glue value. Depending on the configuration of the chain of proofs, proof system 110B may deliver the second glue value to a subsequent proof system 110C and/or may confirm the function result as the final result having considered each transaction data from a set.

If subsequent proof systems 110 still remain, proof system 110B may transmit the updated function result to the subsequent proof system 110C. Depending on privacy considerations, proof system 110B may deliver this intermediary function result privately and/or may publish the intermediary function result on blockchain 135 in a hash format. Similarly, proof system 110B may deliver the second glue value to proof system 110C privately and/or via publishing on blockchain 135. Publishing on blockchain 135 may provide public proof that the function was applied to particular transaction data. In this manner, the glue values may also be used to verify each individual result from the proof systems 110. Further, the particular proof system 110 executing method 200 may be located in different locations in the chain.

If the particular proof system 110 executing method 200 is the final proof system 110 in the chain, the proof system 110 may supply a data requesting system 140 with the final function result as well as verification of the processing via the ZKP. In this manner, the chain of proof systems 110 may provide divided processing as well as verification that each element of a data set was considered in generating a final function result. Via the use of glue values, each function result may be verified while still maintaining the zero-knowledge nature of the proof without exposing the data requesting system 140 to the underlying transaction data considered by each proof system 110.

In an embodiment, a data supply system may generate a zero-knowledge proof ("ZKP"). The ZKP may indicate that a function or algorithm has been applied to underlying private data. The data supply system may provide the ZKP to a data requesting system to supply proof that the data supply system applied the indicated function or algorithm. The ZKP may also indicate that the underlying private data has been used in generating the function result. The data supply system may also use a blockchain to provide public verification of the underlying transaction data. Using the ZKP, the data supply system may supply proof to the data requesting system that the data supply system applied the function. The data supply system may then provide the function result and the ZKP to the data requesting system. The data requesting system may then verify the ZKP to confirm that the data supply system applied the algorithm to the underlying private data. In this manner, the data supply system may supply a result to the data requesting system without necessarily providing the underlying private data and/or exposing this data to the data requesting system.

To illustrate a non-limiting example, the data supply system may be a computer system operated by a user. The data supply system may maintain private data corresponding to the user. The data requesting system may be a financial institution computing system. A user using the data supply system may wish to supply a credit score to the data requesting system while maintaining privacy over the user's own personal transaction information. In this case, the user may not use a third-party to compute the credit score.

For the financial institution to accept the self-calculated credit score from the user, the financial institution may require proof of the underlying transaction data corresponding to the user as well as proof of the correct calculation based on the underlying data. In this manner, the calculation may be the particular algorithm used for calculating a credit score.

To verify that data used to calculate the credit score are valid transaction data, the data supply system may use a blockchain. The blockchain may represent a distributed digital ledger with blocks representing transaction data. The blocks may include cryptographic hashes of the transactions. Using the blockchain, the data supply system may commit transaction data that may be verified by a transaction verification system. For example, when the user conducts a purchase or transaction that would affect the user's credit score, the user may commit the transaction to the blockchain. The transaction verification system may be the other party to the transaction. In this manner, the transaction verification system may verify the transaction as recorded on the blockchain. Multiple transaction verification systems may verify multiple transactions on the blockchain. In view of the encoded or hashed data stored on the blockchain, the user's private data may remain private while still being verifiable.

With this information committed to the blockchain, the data requesting system may wish to verify that the data supply system uses the data stored on the blockchain and does not use fabricated data. Further, the data requesting system may wish to verify that the correct credit score algorithm is used to calculate the credit score based on the correct underlying private data.

In view of these objectives, the data supply system may confirm that the data used matches the data committed to the blockchain. For example, if the data committed to the blockchain is in a hash format, the data supply system may recalculate the hash with the current data and compare the result to determine if the hash matches the hash data stored on the blockchain. If the hash data matches, the data supply system may compute the function using the data. For example, the data supply system may compute the credit score using the private underlying data.

The data supply system may then apply a verification algorithm to provide attestation that the correct inputs were used. The verification algorithm may use an obfuscation program to embed a signed key to the result. The data supply system may sign the calculated result with the obfuscation program to indicate that the correct credit score formula was used and that the initial inputs were not fabricated. The data supply system and the data requesting system may agree on a protocol for the obfuscation program such that the data requesting system may rely upon the signed key to indicate that the provided information is correct. When the data requesting system receives the signed key as well as the result, the correct signed key may indicate that the result has been verified and attested at the data supply system. The generation and receipt of the key may represent a ZKP, allowing the data requesting system to verify a received result without directly accessing the underlying private data.

Figure 3:
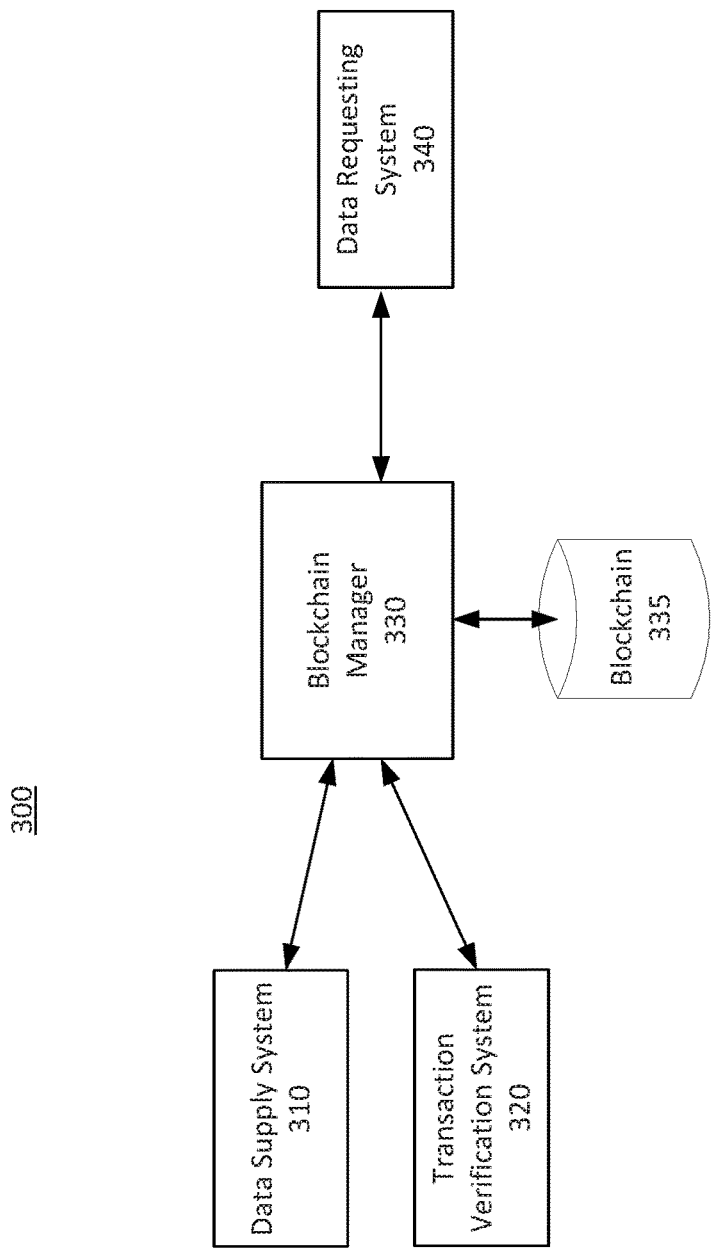
FIG. 3 depicts a block diagram of a blockchain environment, according to some embodiments.

FIG. 3 depicts a block diagram of a blockchain environment 300, according to some embodiments. Blockchain environment 300 may include a data supply system 310, transaction verification system 320, blockchain manager 330, blockchain 335, and/or data requesting system 340.

Data supply system 310, transaction verification system 320, and/or data requesting system 340 may interact with blockchain manager 330 to access blockchain 335. This access may include reading blocks and/or committing new information to blockchain 335. In an embodiment, the data stored in the blocks may be in a hashed format to maintain privacy of the data stored.

Data supply system 310 may include one or more processors, memory, servers, routers, modems, and/or antennae configured to interface with blockchain manager 330, transaction verification system 320, and/or data requesting system 340. Data supply system 310 may communicate with blockchain manager 330, transaction verification system 320, and/or data requesting system 340 via a local area network (LAN), a wireless network, and/or via the Internet. Data supply system 310 may commit data to blockchain 335 via blocks.

Blockchain manager 330 and/or blockchain 335 may include a digital ledger that may record transactions across decentralized and/or distributed computer nodes. In an embodiment, blocks of information committed to blockchain 335 may not be altered retroactively. Blockchain manager 330 may include one or more nodes configured to verify and/or audit transaction data. Based on the configuration of blockchain 335, data supply system 310, transaction verification system 320, and/or data requesting system 340 may also be computing nodes configured to communicate with other nodes represented by blockchain manager 330. Blockchain 335 may be a public blockchain, private blockchain, a semi-decentralized blockchain, and/or a consortium blockchain.

In blockchain environment 100, data supply system 310 may provide information to data requesting system 340 via the blockchain without exposing underlying private data, in this manner, data supply system 310 may generate a ZKP. The ZKP may indicate that a function or algorithm has been applied to underlying private data. Data supply system 310 may apply the function or algorithm to the private data and then provide the ZKP to data requesting system 340 to supply proof of the application of the indicated function or algorithm to the private data. The ZKP may also indicate that the underlying private data has been used in generating the function result.

To verify to data requesting system 340 that the algorithm has not been applied to fabricated data, data supply system 310 may use blockchain 335 to commit data. For example, if the underlying private data is transaction data between a user and a second party, data supply system 310 may commit the transaction data to blockchain 335 and transaction verification system 320 may commit the same transaction data and/or confirm the transaction data on blockchain 335. The data may be stored as a hash to preserve privacy. In this manner, the public storage on blockchain 335 may indicate that the transaction occurred in a verifiable manner.

When data supply system 310 applies an algorithm or function to the underlying data, data supply system 310 may confirm that the correct data is being used by comparing the hash value stored on blockchain 335. For example, if the data committed to blockchain 335 is in a hash format, data supply system 310 may recalculate the hash with the current data and compare the result to determine if the hash matches the hash data stored on blockchain 335. If the hash data matches, data supply system 310 may compute the function using the data. This computation may generate the function result desired by data requesting system 340.

Data supply system 310 may then apply a verification algorithm to provide attestation that the correct inputs were used. The verification algorithm may use an obfuscation program to embed a signed key to the function result. Data supply system 310 may sign the function result with the obfuscation program to indicate that the correct function or algorithm was applied and/or that the initial inputs were not fabricated. Data supply system 310 and data requesting system 340 may agree on a protocol for the obfuscation program such that data requesting system 340 may rely upon the signed key to indicate that the provided information is correct. When data requesting system 140 receives the signed key as well as the result, the correct signed key may indicate that the result has been verified and attested at data supply system 310. The generation and receipt of the key may represent a ZKP, allowing data requesting system 340 to verify received results without directly accessing the underlying private data.

To illustrate an example, a user using data supply system 310 may wish to supply a credit score to data request system 340 based on the user's underlying transaction data. The user, however, may not wish to expose the underlying transaction data to data requesting system 340 but would like to provide a ZKP to data requesting system 340 to indicate that the provided credit score has not been fabricated. The user would like to indicate that the true transaction data has been used to calculate the credit score and that the correct formula for calculating the credit score has been used.

To demonstrate that the correct transaction data has been used, data supply system 310 may commit the transaction data to blockchain 335. Transaction verification system 320 may represent another party to the transaction and may confirm that the committed transaction data is valid. For example, the user of data supply system 310 may have received a mortgage loan from an institution using transaction verification system 320. The transaction data may record information related to the mortgage loan, such as, for example, the amount of the loan or the duration of the loan. Similarly, the user may have a student loan and/or make student loan payments. The same or a different transaction verification system 320 may confirm the student loan transactions on blockchain 335. This information may be encoded using a hash function to protect the privacy of the data while still publicly posting the information to blockchain 335. Transaction verification system 320 may then confirm that the transaction occurred in the manner described by data supply system 310.

For calculating the credit score, data supply system 310 may use the underlying transaction data as maintained at data supply system 310. Data supply system 310 may verify that this transaction data matches the transaction data stored on blockchain 335 by recomputing the hash function and comparing the hash value with the hash stored on blockchain 335. If the hash values match, the underlying data matches the data stored on blockchain 335. Data supply system 310 may use this verification when generating a ZKP to indicate that data supply system 310 has not fabricated transaction data.

Using the verified transaction data, data supply system 310 may apply the credit score calculation algorithm to the verified transaction data. The credit score calculation algorithm may be applied serially or in parallel with a verification algorithm. For example, the verification algorithm may produce the credit score as a function result while also applying an obfuscation program to embed a signed key to the result. Data supply system 310 may sign the calculated credit score result with the obfuscation program to indicate that the correct credit score formula was used and that the initial inputs were not fabricated. The obfuscation program also encrypts the signing key so that the result is secure from tampering. Data requesting system 340 may rely on the key to signify that the provided result has not been falsified.

Data supply system 310 and data requesting system 340 may agree on a protocol for the obfuscation program such that data requesting system 340 may rely upon the signed key to indicate that the provided information is correct. When data requesting system 340 receives the signed key as well as the result, the correct signed key may indicate that the result has been verified and attested at data supply system 310. The generation and receipt of the key may represent a ZKP, allowing the data requesting system to verify a received result without directly accessing the underlying private data. In an embodiment, data supply system 310 may create a ZKP using a zero-knowledge succinct non-interactive argument of knowledge ("zk-SNARK").

In an embodiment, data supply system 310 may use serial proof chaining configuration 100A as described with reference to FIG. 1A and/or parallel proof chaining configuration 100B as described with reference to FIG. 1B to generate one or more proofs. Proof systems 110 may be instantiated using hardware from data supply system 310 and/or include hardware external to data supply system 310. Proof systems 110 may include one or more logical circuits or logic systems. For example, data supply system 310 may communicate with one or more proof systems 110 to generate the one or more proofs. The one or more proofs may represent intermediary processing steps in the application of a function to demonstrate that each instance of transaction data in a set has been considered in generating the function result.

In an embodiment, when data supply system 310 uses proof systems 110, a final proof system 110 may be used by to transmit a final function result and the corresponding glue value to data requesting system 340 to represent the value and the ZKP. To verify that the ZKP is valid and that the final function result has been generated from each instance of transaction data without tampering, data supply system 310 and/or data requesting system 340 may verify each proof using each glue value generated from each proof system 110. If every glue value returns a verified result, then the function result may be considered valid and proven.

Figure 4:
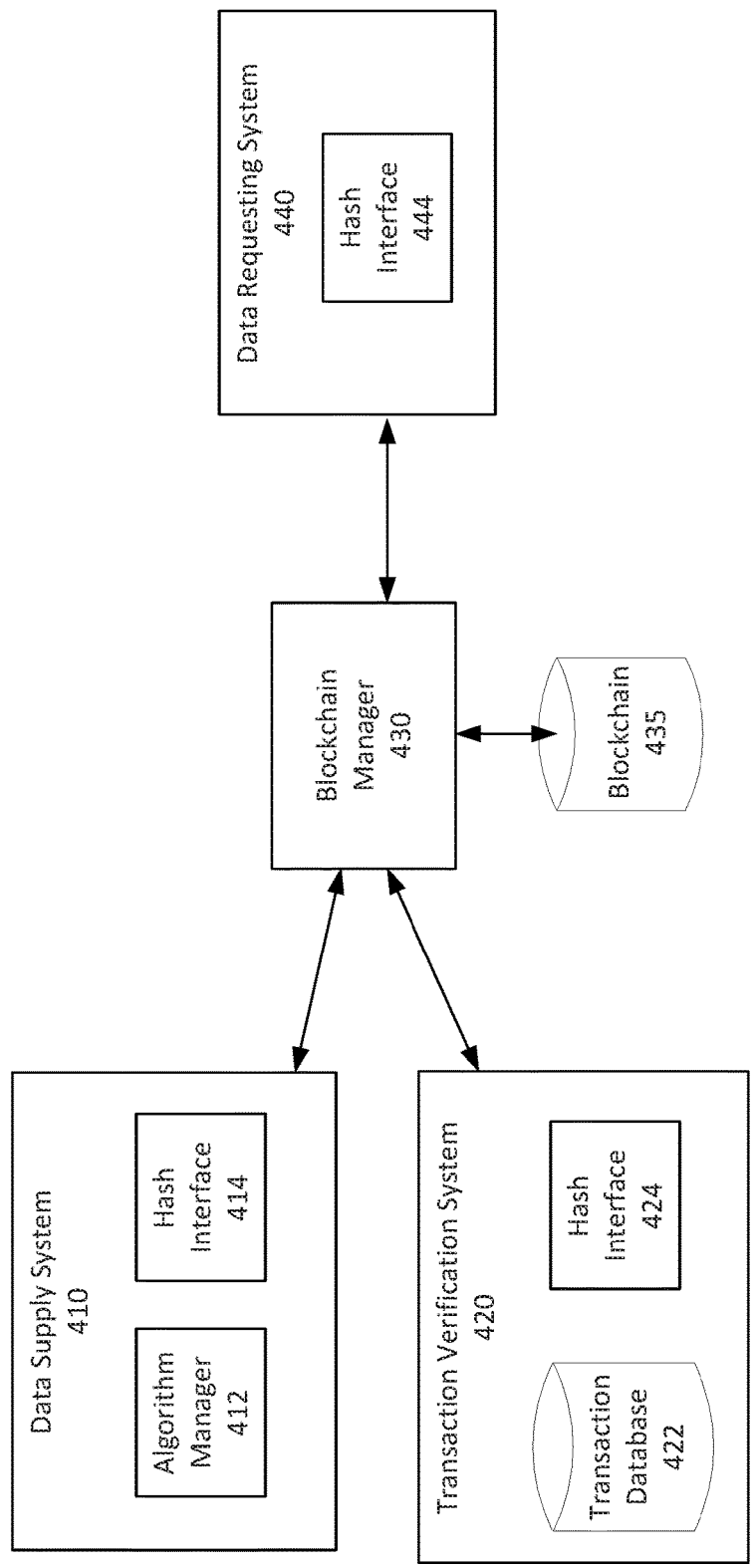
FIG. 4 depicts a block diagram of a blockchain environment displaying sub-system interfaces, according to some embodiments.

FIG. 4 depicts a block diagram of a blockchain environment 400 displaying sub-system interfaces, according to some embodiments, Blockchain environment 400 may operate in a manner similar to blockchain environment 300 as described with reference to FIG. 3. For example, blockchain environment 400 may include data supply system 410 that may operate in a manner similar to data supply system 310; transaction verification system 420 that may operate in a manner similar to transaction verification system 320; blockchain manager 430 that may operate in a manner similar to blockchain manager 330; blockchain 435 that may operate in a manner similar to blockchain 335; and/or data requesting system 440 that may operate in a manner similar to data requesting system 340. Blockchain environment 400, however, displays several sub-systems that aid in the generation and verification of a ZKP.

Data supply system 410 may include algorithm manager 412 and/or hash interface 414, Algorithm manager 412 may manage the application of algorithms and/or functions to be applied to the underlying private data maintained by data supply system 410. For example, algorithm manager 412 may maintain the credit score formula described with reference to FIG. 3. Depending on the application, algorithm manager 412 may maintain and/or apply the corresponding algorithm to generate a function result at data supply system 410.

Application manager 412 may also apply a verification algorithm to indicate that the function result does not include fabricated data and/or has not applied a false algorithm. This verification algorithm may apply the obfuscation program to generate a signed key indicating that the underlying transaction data has not been fabricated. In an embodiment, application manager 412 may use an isolated environment in which computations may be run and signed using cryptographic keys embedded within secure hardware. Application manager 412 may sign both the result and the code that was executed. To verify the execution of the code and/or the result, the verifier may check that the result was signed with the proper key. This key may represent a ZKP that may be transmitted to data requesting system 440 along with the function result to prove the function result without supplying the underlying transaction data.

In an embodiment, data supply system 410 may use hash interface 414 to provide the function result to data requesting system 440 in a secure manner. Hash interface 414 may encode or encrypt the function result and/or the ZKP in a manner decodable by hash interface 444 at data requesting system 440. In this manner, even if data supply system 410 commits the function result to blockchain 435 via blockchain manager 430, other parties may not be able to decrypt the committed data. In this manner, the function result may be encrypted and readable by the intended data requesting system 440.

Similarly, transaction verification system 420 may include hash interface 424. Hash interface 424 may allow transaction verification system 420 to decrypt transaction data stored on blockchain 435 corresponding to data supply system 410. For example, using hash interface 414, data supply system 410 may commit transaction data to blockchain 435 in an encrypted format. Transaction verification system 420 may then decrypt the committed data to confirm and/or reject the transaction data using hash interface 424. Similarly, transaction verification system 420 may commit transaction data to blockchain 435 via hash interface 424. The transaction data may be committed from transaction database 422 which may include one or more memory storage devices. Transaction verification system 420 may also verify committed transaction data from blockchain 435 by comparing the transaction data with the transaction data stored in transaction database 422.

In view of the hash information committed to blockchain 435, different permissions may be maintained throughout each process. For example, data supply system 410 and transaction verification system 420 may maintain privacy related to underling transaction data despite storage on a possibly publically accessible blockchain 435. Similarly, data supply system 410 and data requesting system 440 may also maintain privacy in communications of function results. Although the underlying transaction data may be stored in blockchain 435, data requesting system 440 may not be able to view and/or access the underlying transaction data due to the hashing. In this manner, even if the same blockchain 435 is used, data supply system 410 may prevent data requesting system 440 from accessing the underlying transaction data while still providing a trustable function result based on the underlying transaction data.

Figure 5:
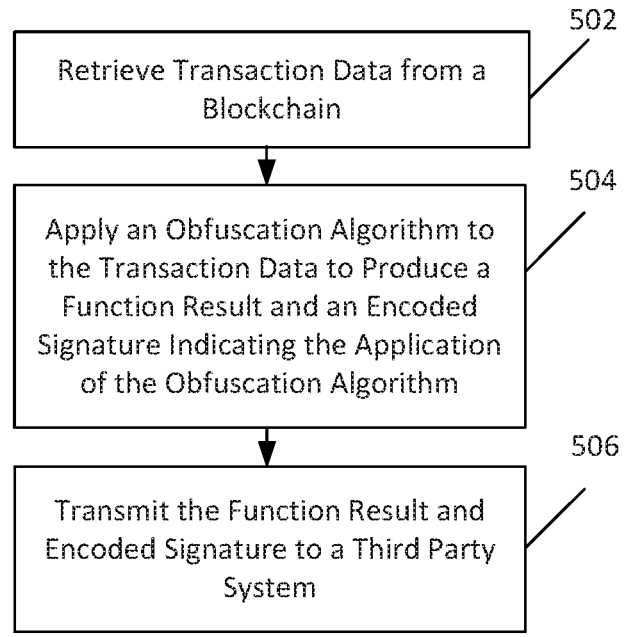
FIG. 5 depicts a flowchart illustrating a method for generating a ZKP, according to some embodiments.

FIG. 5 depicts a flowchart illustrating a method 500 for generating a ZKP, according to some embodiments. Method 500 shall be described with reference to FIG. 3; however, method 500 is not limited to that example embodiment.

In an embodiment, data supply system 310 may utilize method 500 to generate a ZKP. While method 500 is described with reference to data supply system 410, method 500 may be executed on any computing device, such as, for example, the computer system described with reference to FIG. 11 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 5, as will be understood by a person of ordinary skill in the art.

At 502, data supply system 310 may retrieve transaction data from a blockchain 335. The retrieved transaction data may be in a hash format and may be decrypted by data supply system 310. Data supply system 310 may use the retrieved transaction data to verify locally maintained transaction data. For example, data supply system 310 may compare a hash version of the transaction data stored locally with the retrieved transaction data. If data supply system 310 identifies that the hash versions match, then data supply system 310 may designate the locally stored data as verified transaction data.

Similarly, in an embodiment, data supply system 310 may retrieve the data to use as the transaction data. For example, data supply system 310 may not locally store and/or manage the data. In this manner, data supply system 310 may retrieve the transaction data from blockchain 335 to use in the calculation of the applied function or algorithm.

At 504, data supply system 310 may apply an obfuscation algorithm to the transaction data to produce a function result and an encoded signature indicating the application of the obfuscation algorithm. The obfuscation algorithm may include one or more sub-steps depending on the configuration of the algorithm. At 504, data supply system 310 may apply a function to the transaction to generate the function result. The function may be the desired processing from the transaction data. For example, in an embodiment, the function may be the calculation of a credit score, an average of sensor measurements, a compilation of records, and/or other algorithms. The function may also calculate other statistical measures such as a summation, average, or variance. Other sensor measurements may include audio captured by a microphone or images captured using an image sensor.

Upon generating the function result, the obfuscation algorithm may generate an encoded signature indicating that the correct function has been applied. The encoded signature may be a signed key which may be encoded within the function result and/or as a separate data structure. The obfuscation algorithm may also indicate that the transaction data has not been altered and/or falsified via the generation of the encoded signature. In this manner, the obfuscation program may generate a ZKP.

While this process may include one or more sub-steps, in an embodiment, the obfuscation algorithm may generate the function result and/or the encoded signature simultaneously. For example, the verification algorithm may verify the underlying transaction data to ensure that no transaction data has been falsified while also computing the function result and the encoded signature.

At 506, data supply system 310 may transmit the function result and/or the encoded signature to a third party system. The third party system may be, for example, data requesting system 340. In an embodiment, data supply system 310 may provide this information in response to a prompt or a request message from data requesting system 340. In an embodiment, data supply system 310 may transmit this information without a prompt.

By receiving the function result as well as the encoded signature, the third party system may recognize that data supply system 310 used the verified transaction data and/or applied the corresponding algorithm to generate a valid function result. In this manner, the third party system may receive the ZKP and recognize the proof. This proof may serve as verification that the function result may be trusted.

Figure 6:
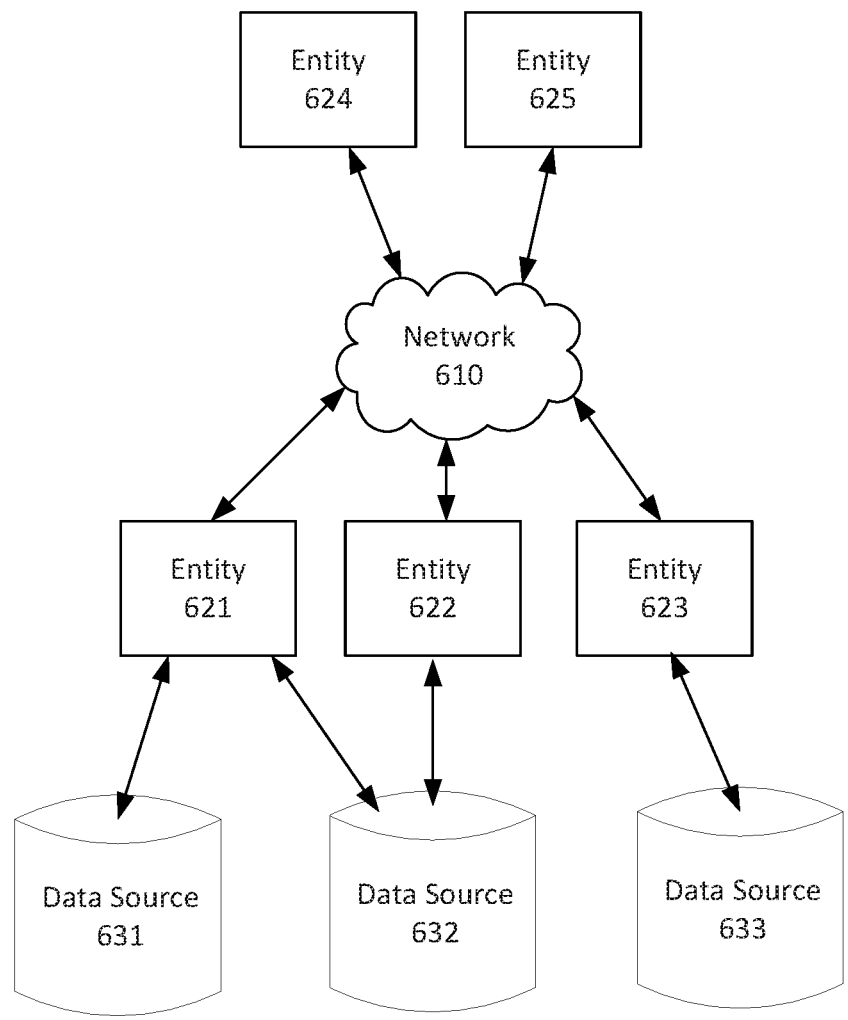
FIG. 6 depicts a block diagram of a communication system, according to some embodiments.

FIG. 6 is a block diagram illustrating a possible implementation of a communicating system. Two or more entities may communicate with each other. In this example, five entities 621, 622, 623, 624 and 625 may communicate with each other over network 610. In some embodiments, any entity may communicate with all other entities, while in other embodiments the communication among entities is restricted to specific pairs of entities. In some embodiments, the entities may communicate directly with each other, and/or through a third party system, such as a cloud platform and/or a server connected to network 610. In some embodiments, network 610 may include any combination of the Internet, phone networks, cellular networks, satellite communication networks, private communication networks, virtual private networks (VPN), a group of point-to-point communication lines that connect pairs of entities, email servers, instant messaging servers, file servers, package delivery service delivering digital and/or non-digital media from one entity to the other, and so forth. In some embodiments, an entity, such as entities 621, 622, 623, 624 and 625, may include a computerized system 700, for example as described in FIG. 7. In some embodiments, an entity, such as entities 621, 622, 623, 624 and 625, may include desktop computers, laptop computers, tablets, mobile devices, server computers, applications, cloud computing platforms, virtual machines, and so forth.

In some embodiments, one or more entities may have access to one or more data sources. In some examples, a data source may be inaccessible to some entities, while in other examples, a data source may be accessible by all entities. In this example, entity 621 has access to data source 631 and data source 632, entity 622 has access to data source 632, and entity 623 has access to data source 633. In some examples, a data source may comprise digital information stored in a memory unit, such as files, databases, digital records, digital images, and so forth. In some examples, a data source may comprise readings from one or more sensors. Some examples of such sensors may include audio sensors; image sensors; accelerometers; positioning sensors; chemical sensors; temperature sensors; barometers; environmental sensors; pressure sensors; proximity sensors; electrical impedance sensors; electrical voltage sensors; electrical current sensors; and so forth.

Figure 7:
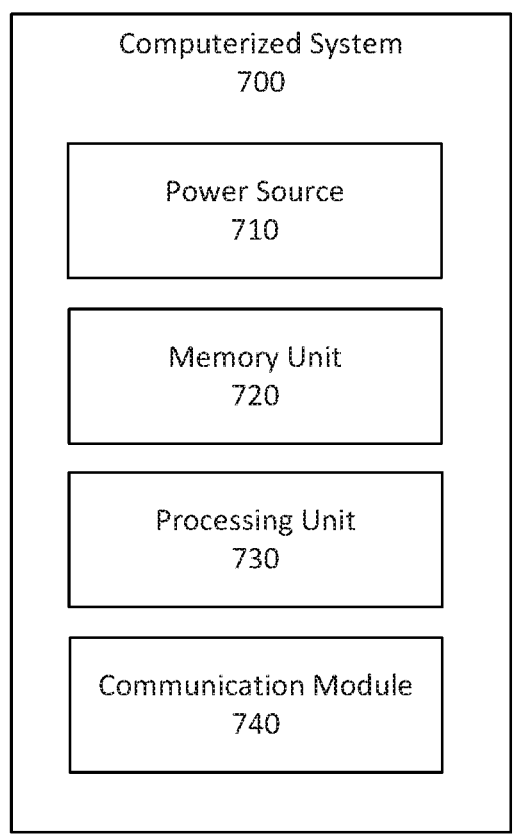
FIG. 7 depicts a block diagram of a computer system, according to some embodiments.

FIG. 7 is a block diagram illustrating a possible implementation of a computerized system 700. In this example, computerized system 700 comprises: one or more power sources 710; one or more memory units 720; one or more processing units 730; and one or more communication modules 740. In some implementations, additional components may be included in computerized system 700, while some components listed above may be excluded. In some embodiments, power sources 710 and/or communication modules 740 may be excluded from the implementation of computerized system 700. In some embodiments, computerized system 700 may further comprise one or more of the followings: one or more audio output units; one or more visual outputting units; one or more tactile outputting units;

one or more sensors; one or more clocks; one or more user input devices; one or more keyboards; one or more mouses; one or more touch pads; one or more touch screens; one or more antennas; one or more output devices; one or more audio speakers; one or more display screens; one or more augmented reality display systems; one or more LED indicators; and so forth.

In some embodiments, power sources 710 may be configured to power computerized system 700. Some possible implementation examples power sources 710 may comprise: one or more electric batteries; one or more capacitors; one or more connections to external power sources; one or more power convertors; one or more electric power generators; any combination of the above; and so forth.

In some embodiments, processing units 730 may be configured to execute software programs, for example software programs stored in memory units 720, software programs received through communication modules 740, and so forth. Some possible implementation examples of processing units 730 may comprise: one or more single core processors; one or more multicore processors; one or more controllers; one or more application processors; one or more system on a chip processors; one or more central processing units; one or more graphical processing units; one or more neural processing units; any combination of the above; and so forth. In some examples, the executed software programs may store information in memory units 720. In some cases, the executed software programs may retrieve information from memory units 720.

In some embodiments, processing units 730 may support a protected execution of software, ensuring that a specific version of software is executed and/or that memory used by the software is not modified by external sources. For example, processing units 730 may allow software to create and/or use private regions of memory, protect selected code and/or data from disclosure and/or modification, detect and/or prevent tampering of code and/or data, securely encrypt selected code and/or data, and so forth.

In some embodiments, communication modules 740 may be configured to receive and/or transmit information. Some possible implementation examples of communication modules 740 may comprise: wired communication devices; wireless communication devices; optical communication devices; electrical communication devices; radio communication devices; sonic and/or ultrasonic communication devices; electromagnetic induction communication devices; infrared communication devices; transmitters; receivers; transmitting and receiving devices; modems; network interfaces; wireless USB communication devices, wireless LAN communication devices; Wi-Fi communication devices; LAN communication devices; USB communication devices; FireWire communication devices; Bluetooth communication devices; cellular communication devices, such as GSM, CDMA, GPRS, W-CDMA, EDGE, CDMA2000, etc.; satellite communication devices; and so forth.

In some implementations, control signals and/or synchronization signals may be transmitted and/or received through communication modules 740. In some implementations, information received though communication modules 740 may be stored in memory units 720. In some implementations, information retrieved from memory units 720 may be transmitted using communication modules 740. In some implementations, input and/or user input may be transmitted and/or received using communication modules 740. In some implementations, output information may be transmitted and/or received through communication modules 740.

Figure 8:
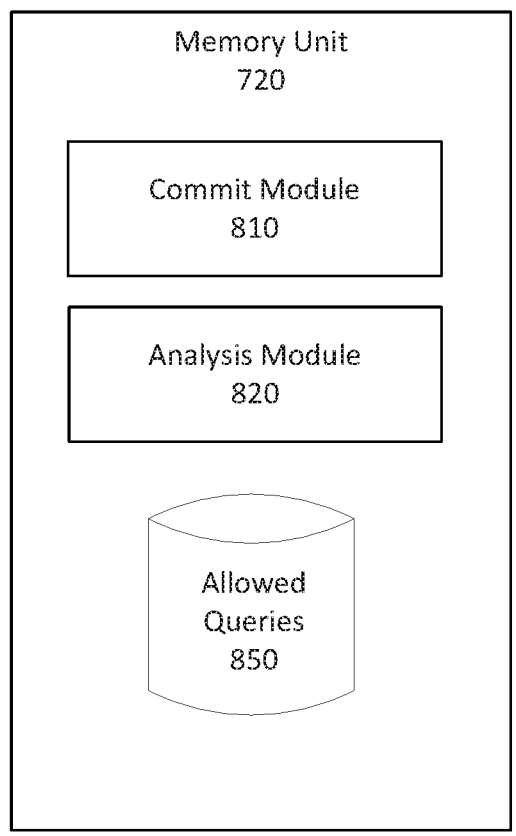
FIG. 8 depicts a block diagram of a memory unit, according to some embodiments.

FIG. 8 illustrates an exemplary embodiment of a memory containing software modules. Included in memory unit 720 are commit module 810, analysis module 820, and a set of allowed queries 850. Modules 810, 820 may contain software instructions for execution by at least one processing device, such as processing unit 730, by computerized system 700, and so forth. Commit module 810 and analysis module 820 may cooperate to provide analysis of committed information and/or using committed software.

In some embodiments, commit module 810 may commit on an instance and/or a version of information, on a version of software, and so forth. For example, one or more entities with access to a data source may use commit module 810 to commit on an instance and/or a version of information from the data source, to commit on information derived from an instance and/or a version of information from the data source, to commit on a version of software used to derive information from an instance and/or a version of information from the data source, to commit on a preprocessed information obtained by preprocessing an instance and/or a version of information from the data source, to commit on a version of software used to preprocess an instance and/or a version of information from the data source, and so forth. In some examples, commit module 810 may sign the committed instance and/or version of the information, and/or the committed version of software, using a cryptographic commitment scheme, producing a cryptographic signature. In some cases, the cryptographic signature may be used at a later stage to verify that a given instance and/or version of the information is the instance and/or version of the information that was originally signed, and/or to verify that a given version of software is the version of software that was originally signed. The cryptographic signature may be transmitted to another entity, transmitted to a third party, sealed and given to an external entity for safekeeping, made publicly available, posted on a blockchain, and so forth. In some examples, commit module 810 may produce the cryptographic signature by applying a hash function, such as a collision resistance hash function, on the instance and/or version of the information and/or version of software. In some examples, commit module 310 may produce the cryptographic signature by signing the instance and/or version of the information using a digital signature, such as RSA signature, Lamport signature, Merkle signature, Rabin signature, and so forth. In some examples, a copy of the committed instance and/or version of the information, and/or the committed version of software, may be provided to an external entity, may be provided to a third party for safekeeping, may be stored in memory, and so forth.

In some embodiments, analysis module 820 may compute one or more values based, at least in part, on information from the data source. For example, one or more entities with access to a data source may use analysis module 820 to compute one or more values based, at least in part, on information from the data source. In some examples, analysis module 820 may compute values by applying a function to the information from the data source. In another example, analysis module 820 may compute values by processing the information from the data source using an algorithm or computer software. In some examples, the computed values may be transmitted to an external entity, provided to a third party for safekeeping, stored in memory, and so forth. In some examples, analysis module 820 may compute values based on, at least in part, a committed instance and/or version of information, such as an instance and/or a version of information committed on using commit module 810. In some examples, analysis module 820 may compute values using, at least in part, a committed function, algorithm, and/or software, such as a function, an algorithm, and/or software committed on using commit module 810. Examples of possible execution manners of analysis module 820 may include: continuous execution, repeatedly executing the module; periodic execution, executing the process at selected times; execution upon the detection of a trigger, where examples of such trigger may include a trigger from a user, a trigger from another process, a trigger received though communication modules 740, etc.; as part of process 900 described below; any combination of the above; and so forth. In some examples, analysis module 820 may compute one or more values based, at least in part, on one or more parameters.

In some embodiments, set of allowed queries 850 may comprise information related to one or more queries. In some examples, set of allowed queries 850 may be maintained within memory unit 720, for example as a data structure, a list, a database, and so forth. In some examples, one or more queries may be selected and/or accessed based on query identification information, for example by processing unit 730. In some examples, queries may be added to the set of allowed queries 850 and/or removed from the set of allowed queries 850, for example by processing unit 730, while in other examples the set of allowed queries 850 is perpetual. Examples of query identification information may include a query index, an offset in memory, and so forth. In some examples, a query from the set of allowed queries 850 may have no unspecified parameter, one or more unspecified parameters, and so forth. Examples of such unspecified parameters may include: a number, a string, a name, an identifier, an index, a formula, a function, an algorithm, computer instructions, and so forth. In some examples, a query from the set of allowed queries 850 that has at least one unspecified parameter may be accompanied by a specification of allowed values. For example, such specification of allowed values may comprise a list of allowed values, a range of allowed values, a function and/or an algorithm and/or software that checks a value and decides if the value is allowed, and so forth.

Figure 9:
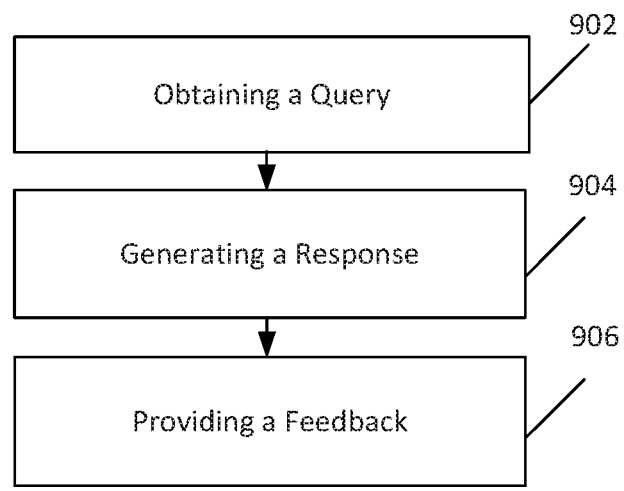
FIG. 9 depicts a flowchart illustrating a method for responding to a query, according to some embodiments.

FIG. 9 illustrates an example of a process 900 for responding to queries. In some examples, process 900, as well as all individual steps therein, may be performed by various aspects of: processing unit 730, computerized system 700, and so forth. For example, process 900 may be performed by processing units 730, executing software instructions stored within memory units 720. Process 900 may comprise: obtaining a query (Step 902); generating a response (Step 904); and providing a feedback (Step 906). In some implementations, process 900 may comprise one or more additional steps, while some of the steps listed above may be modified or excluded. In some implementations, one or more steps illustrated in FIG. 9 may be executed in a different order and/or one or more groups of steps may be executed simultaneously and vice versa. For example, Step 904 may be executed after and/or simultaneously with Step 902, Step 906 may be executed after and/or simultaneously with Step 904 and/or Step 906, and so forth. Examples of possible execution manners of process 900 may include: continuous execution, returning to the beginning of the process once the normal execution process ends; periodic execution, executing the process at selected times; execution upon the detection of a trigger, where examples of such trigger may include a trigger from a user, a trigger from another process, etc.; execution upon reception of a query; any combination of the above; and so forth.

In some embodiments, obtaining a query (Step 902) may comprise obtaining one or more queries, in some examples, obtaining a query (Step 902) may comprise receiving one or more queries using communication modules 740. In some examples, obtaining a query (Step 902) may comprise reading one or more queries from memory unit 720. In some examples, the one or more queries obtained by Step 902 may be received from another entity, from a user, from another process, from process 1000, and so forth. In some examples, obtaining a query (Step 902) may comprise obtaining query identification information, and retrieving and/or accessing a query from the set of allowed queries 850 based, at least in part, on the query identification information. For example, obtaining the query identification information may comprise receiving the query identification information using communication modules 740, reading the query identification information from memory unit 720, receiving the query identification information from another entity, receiving the query identification information from a user, receiving the query identification information from another process, and so forth.

In some embodiments, obtaining a query (Step 902) may further comprise obtaining one or more parameters related to the queries. Examples of such parameters may include: a number, a string, a name, an identifier, an index, a formula, a function, an algorithm, computer instructions, and so forth. In some examples, obtaining one or more parameters related to the queries may comprise receiving the parameters using communication modules 740, reading the parameters from memory unit 720, receiving the parameters from another entity, receiving the parameters from a user, receiving the parameters from another process, and so forth. In some examples, the query identification information and the parameters related to the queries may be obtained using the same means and/or from the same source, while in other examples the query identification information may be obtained from one source and at least one of the parameters related to the queries may be obtained from other one or more sources.

In some embodiments, obtaining a query (Step 902) may comprise validating that one or more obtained parameters are valid, for example by checking the obtained parameters according to a specification of allowed values, such as a specification of allowed values accompanying the query in the set of allowed queries 850. In some examples, upon a determination that at least one obtained parameter is invalid, Step 902 may provide a notification that an obtained parameter is invalid. For example, the notification may be provided to a user, to another entity, to another process, and so forth. For example, the notification may be written to memory unit 720, transmitted using communication modules 740, and so forth. In some examples, upon a determination that at least one obtained parameter is invalid, Step 902 may replace the invalid parameter with a valid parameter. In some example, upon a determination that at least one obtained parameter is invalid, the query may be ignored.

In some embodiments, obtaining a query (Step 902) may comprise obtaining a query comprised of a plurality of sub-queries, and/or a query that may be decomposed to a plurality of sub-queries. In some examples, obtaining a query (Step 902) may further comprise obtaining ordering information related to the plurality of sub-queries and/or determining ordering information related to the plurality of sub-queries based, at least in part, on the plurality of sub-queries. The ordering information may specify that some sub-queries need to be handled before other sub-queries, that some sub-queries need to be evaluated when the result of other sub-queries meet certain criteria, that some sub-queries should not be evaluated when the result of other sub-queries meet certain criteria, that some sub-queries should be evaluated in a different way based on the result of other sub-queries, and so forth.

In some embodiments, generating a response (Step 904) may comprise generating one or more responses to one or more queries, for example to one or more queries obtained by Step 902. In some examples, the generated response may be based, at least in part, on one or more parameters, such as parameters obtained by Step 902. In some embodiments, generating a response (Step 904) may comprise generating one or more responses to a plurality of sub-queries, for example to a plurality of sub-queries obtained by Step 902. In some cases, generating a response (Step 904) may ensure that responses to all sub-queries are handled with respect to the same instance and/or version of information, for example with respect to an instance and/or a version of information committed on using commit module 810. In some examples, the generated response may comprise values computed by analysis module 820, and/or be based on values computed by analysis module 820. In some examples, generating a response (Step 904) may comprise evaluating a function, evaluating an algorithm, and/or executing software. The generated response may comprise and/or be based on the result of the function, output of the algorithm, and/or output of the software. In some examples, at least part of the function, algorithm, and/or software used by Step 904, may comprise a committed function, a committed algorithm, and/or committed software, such as a function, an algorithm, and/or software committed on using commit module 810.

In some examples, the generated response may be based, at least in part, on information from a data source. For example, generating a response (Step 904) may be executed by one or more entities with access to a data source, and the generated response may be based, at least in part, on information from the data source. In some examples, the generated response may be based, at least in part, on a committed instance and/or committed version of information, such as a committed instance and/or committed version of information from a data source. For example, the generated response may be based on an instance and/or a version of information committed on using commit module 810.

In some examples, generating a response (Step 904) may be executed, at least in part, by an entity with an access to a data source, by a trusted third party that receives the queries from one entity and information from another entity and generates a response to the queries based on the information, by a computerized system maintained by such trusted third party, and so forth, in some examples, generating a response (Step 904) may be executed, at least in part, by processing units 730 using a protected execution mechanism, ensuring that a specific version of software implementing Step 904 is executed and/or that memory used by the software implementing Step 904 is not modified by external sources.

In some embodiments, generating a response (Step 904) may comprise signing on information related to the execution of Step 904. For example, the signed information may include any combination of: temporal information associated with the execution of Step 904, such as the execution starting time, the execution ending time, the execution duration, running time, etc.; spatial information, the location of the execution associated with the execution of Step 904, such as the location in which at least part of the execution took place; information related to at least part of the hardware taking part in the execution of Step 904, such as a system identifier, a processor identifier, a MAC address of a communication device, etc.; information related to a computer function and/or an algorithm and/or software used in the execution of Step 904, such as a copy, an identifying information, and/or a committed version of the above; inputs to Step 904, such as queries, sub-queries, parameters, etc.; identifier and/or a description of a data source accessed and/or used in the execution of Step 904; information related to an instance and/or a version of information used in the execution of Step 904, and/or to a committed instance and/or committed version of information; identifiers and/or description of entities and/or parties involved in the execution of Step 904; identifiers and/or description of a blockchain used in the execution of Step 904 and/or referenced by Step 904; and so forth.

In some examples, generating a response (Step 904) may comprise signing on information related the execution of Step 904 using a cryptographic signature. In some cases, the cryptographic signature may be used to verify that the cryptographic signature was indeed produced by Step 904 and/or that the cryptographic signature was produced on specific information. In some cases, the cryptographic signature may be transmitted to another entity, transmitted to a third party, sealed and given to an external entity for safekeeping, made publicly available, posted on a blockchain, and so forth. The cryptographic signature may, for example, be produced by applying a hash function, such as a collision resistance hash function, on the signed information. In another example, the cryptographic signature may be produced using a digital signature, such as RSA signature, Lamport signature, Merkle signature, Rabin signature, and so forth. In some examples, generating a response (Step 904) may comprise signing on information related to the execution of Step 904 by a trusted third party.

In some embodiments, generating a response (Step 904) may comprise generating a ZKP. For example, generating a response (Step 904) may comprise generating a ZKP regarding a state of a data source, the content of a data source, the content of an instance and/or a version of information, the content of a committed instance and/or a committed version of information, code and/or functions used by Step 904, the content of a public database and/or blockchain accessed by Step 904, and so forth.

In some embodiments, providing a feedback (Step 906) may comprise providing one or more feedbacks. In some examples, providing a feedback (Step 906) may comprise transmitting one or more feedbacks using communication modules 240. In some examples, providing a feedback (Step 906) may comprise writing one or more feedbacks to memory unit 720. In some examples, the one or more feedbacks provided by Step 906 may be transmitted to other entities, provided to one or more users, provided to other processes, and so forth. In some examples, the feedbacks provided by Step 906 may be sealed and given to an external entity for safekeeping, made publicly available, posted on a blockchain, and so forth. In some examples, feedbacks provided by Step 906 may be based, at least in part, on one or more responses generated by Step 904. In some examples, the one or more feedbacks provided by Step 906 may be provided in response to one or more queries, for example in response to one or more queries and/or sub-queries obtained by Step 902. The feedbacks may be provided to the entity, user, and/or process in which the query was originated; to a different entity, user, and/or process; and so forth. The feedbacks may include a reference to the query, information related to the query, information related to parameters associated with the query, and so forth.

In some embodiments, feedbacks provided by Step 906 may comprise an indication related to a problem. Some examples of such problems may include: a problem with one or more queries, for example in with one or more queries and/or sub-queries obtained by Step 902; a problem with entity, user, and/or process in which a query was originated, for example in case of unfitted permission for such query; a problem with one or more parameters associated with the query, such as invalid value; a problem with an instance and/or a version of information that is used by Step 904, and/or with an instance and/or a version of information committed on using commit module 810; a problem with values computed by analysis module 820; a problem with and/or in the evaluation of a function, an algorithm, and/or software; a problem with a data source; and so forth.

In some embodiments, feedbacks provided by Step 906 may comprise information related to the execution of Step 904. For example, the feedbacks may comprise information related to functions, algorithms, and/or software used by Step 904, including in some examples information related to committed functions, committed algorithms, and/or committed software, such as functions, algorithms, and/or software committed on using commit module 810. In some examples, the feedbacks may comprise information related to entities and/or parties involved in the execution of Step 904. In some examples, the feedbacks may comprise information related to at least part of the hardware taking part in the execution of Step 904, such as a system identifier, a processor identifier, a MAC address of a communication device, and so forth. In some examples, the feedbacks may comprise information related to temporal information associated with the execution of Step 904, such as the execution starting time, the execution ending time, the execution duration, running time, etc.; spatial information the location of the execution associated with the execution of Step 904, such as the location in which at least part of the execution took place; and so forth.

In some embodiments, feedbacks provided by Step 906 may comprise information related to data sources accessed and/or used by Step 906. For example, the feedbacks may comprise identifying information related to a data source, identifying information related to a state of a data source, a copy of at least part of the information obtained from the data source, and so forth. In some embodiments, feedbacks provided by Step 906 may comprise information related to an instance and/or a version of information. For example, the feedbacks may comprise data derived from the information, a copy of at least part of the information, and so forth. In some embodiments, feedbacks provided by Step 906 may comprise information related to a committed instance and/or a committed version of information, such as an instance and/or a version of information committed on using commit module 810. For example, the feedbacks may comprise data derived from the information, a copy of at least part of the information, an identifier of the committed information, a signature associated with the committed information, and so forth. In some embodiments, feedbacks provided by Step 906 may comprise identifiers and/or description of a blockchain used in the execution of Step 904 and/or referenced by Step 904. In some embodiments, feedbacks provided by Step 906 may comprise one or more signatures produced by Step 904, including the signatures described above. For example, the feedbacks may comprise one or more cryptographic signatures, one or more hash values, and so forth. In some examples, the feedbacks may further comprise at least part of the signed information.

In some embodiments, feedbacks provided by Step 906 may comprise one or more ZKPs. For example, feedbacks provided by Step 906 may comprise one or more ZKPs generated by Step 904. In some examples, the ZKP may regard a state of a data source, the content of a data source, the content of an instance and/or a version of information, the content of a committed instance and/or a committed version of information, code and/or functions used by Step 904, the content of a public database and/or blockchain accessed by Step 904, and so forth.

Figure 10:
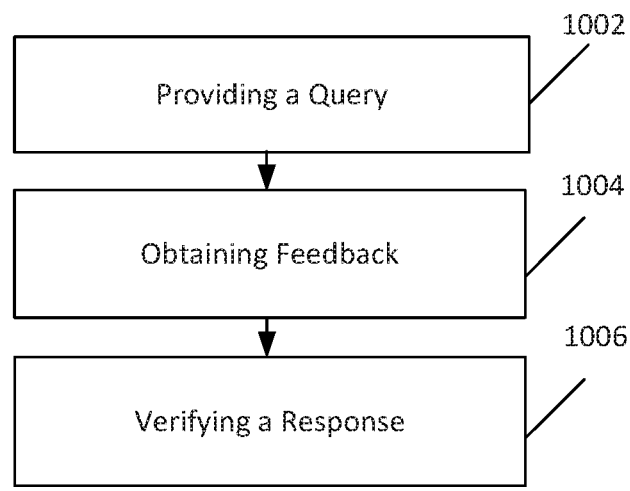
FIG. 10 depicts a flowchart illustrating a method for verifying a response, according to some embodiments

FIG. 10 illustrates an example of a process 1000 for responding to queries. In some examples, process 1000, as well as all individual steps therein, may be performed by various aspects of: processing unit 730, computerized system 700, and so forth. For example, process 1000 may be performed by processing units 730, executing software instructions stored within memory units 720. Process 1000 may comprise: providing a query (Step 1002); obtaining feedback (Step 1004); and verifying response (Step 1006). In some implementations, process 1000 may comprise one or more additional steps, while some of the steps listed above may be modified or excluded. For example, Step 1002 and/or Step 1006 may be excluded from process 1000. In some implementations, one or more steps illustrated in FIG. 10 may be executed in a different order and/or one or more groups of steps may be executed simultaneously and vice versa. For example, Step 1006 may be executed after and/or simultaneously with Step 1004, and so forth. Examples of possible execution manners of process 1000 may include: continuous execution, returning to the beginning of the process once the process normal execution ends; periodically execution, executing the process at selected times; execution upon the detection of a trigger, where examples of such trigger may include a trigger from a user, a trigger from another process, etc.; execution upon reception of a feedback; any combination of the above; and so forth.

In some embodiments, providing a query (Step 1002) may comprise providing one or more queries. In some examples, providing a query (Step 1002) may comprise transmitting one or more queries using communication modules 740. In some examples, providing a query (Step 1002) may comprise writing one or more queries to memory unit 720. In some examples, the one or more queries provided by Step 1002 may be provided to another entity, to a user, to another process, to process 900, and so forth. In some examples, providing a query (Step 1002) may comprise providing query identification information, for example query identification information that identify a query in the set of allowed queries 850.

In some embodiments, providing a query (Step 1002) may comprise providing one or more parameters related to the queries. Examples of such parameters may include: a number, a string, a name, an identifier, an index, a formula, a function, an algorithm, computer instructions, and so forth. In some examples, providing one or more parameters related to the queries may comprise transmitting the parameters using communication modules 740, writing the parameters to memory unit 720, providing the parameters to another entity, providing the parameters to a user, providing the parameters to another process, providing the parameters to process 900 and/or Step 902, and so forth. In some examples, a query and the parameters related to the query may be provided together, while in other examples the query and the parameters may be provided separately. In some examples, all parameters related to a query may be provided together, while in other examples the parameters may be provided in parts.

In some embodiments, obtaining feedback (Step 1004) may comprise obtaining one or more feedbacks. In some examples, obtaining feedback (Step 1004) may comprise receiving one or more feedbacks using communication modules 740. In some examples, obtaining feedback (Step 1004) may comprise reading one or more feedbacks from memory unit 720. In some examples, the one or more feedbacks obtained by Step 1004 may be received from another entity, from a user, from another process, from process 900 and/or Step 906, and so forth. In some examples, obtaining feedback (Step 1004) may comprise reading one or more feedbacks from a blockchain, from a publicly available database, and so forth. In some examples, feedbacks obtained by Step 1004 may be provided by Step 1006, for example in response to queries provided by Step 1002. In some examples, feedbacks obtained by Step 520 may comprise one or more responses generated by Step 1004.

In some embodiments, obtaining feedback (Step 1004) may comprise providing information based, at least in part, on one or more feedbacks obtained by Step 1004. For example, the information may be provided to a user, to another entity, to another process, and so forth. For example, the information may be written to memory unit 720, transmitted using communication modules 740, and so forth.

In some embodiments, the feedbacks obtained by Step 1004 may comprise one or more feedbacks associated with at least one query provided by Step 1002. In some examples, Step 1004 may provide information based, at least in part, on one or more feedbacks obtained by Step 1004 and on the corresponding query. In some examples, process 1000 may return to Step 1002 to provide additional queries based on the content of the obtained feedbacks. For example, the additional queries may refine the original queries.

In some embodiments, feedbacks obtained by Step 1004 may comprise one or more indications related to a problem. In some examples, Step 1004 may provide a notification related to the indicated problem. For example, the notification may be provided to a user, to another entity, to another process, and so forth. For example, the notification may be written to memory unit 720, transmitted using communication modules 740, and so forth. In some examples, the feedbacks obtained by Step 1004 may comprise one or more indications related to a problem with at least one query provided by Step 1002, and in some cases process 1000 may return to Step 1002 to correct the at least one query.

In some embodiments, verifying response (Step 1006) may comprise verifying one or more responses, for example verifying one or more responses contained in feedbacks obtained by Step 1004 and/or one or more responses generated by Step 904. In some examples, the one or more responses may comprise one or more signatures, for example in the form of one or more cryptographic signatures, one or more hash values, and so forth. Step 1006 may verify the signatures, for example using cryptographic tools. In some examples, the one or more responses may comprise one or more computed values, and Step 1006 may verify the validity of the computed values, for example using a validation function and/or an accepted values list or range. In some examples, Step 1006 may verify the response by comparing the one or more responses with previous responses and/or results, by comparing the one or more responses to publicly available data, for example in the form of a public database and/or a blockchain, and so forth.

In some examples, the one or more responses may comprise information related to functions, algorithms and/or software used for generating parts of the response, including in some examples information related to committed functions, committed algorithms, and/or committed software, such as functions, algorithms, and/or software committed on using commit module 810. Step 1006 may verify the validity of the committed functions, committed algorithms, and/or committed software, for example using cryptographic tools. Step 1006 may verify that the expected versions of the functions, algorithms and/or software were used.

In some examples, the one or more responses may comprise information related to at least part of the hardware taking part in the generation of at least part of the response, such as a system identifier, a processor identifier, a MAC address of a communication device, and so forth. Step 1006 may verify that the expected hardware was used.

In some examples, the one or more responses may comprise information related to temporal information associated with the execution of Step 904, such as the execution starting time, the execution ending time, the execution duration, running time, etc.; spatial information the location of the execution associated with the execution of Step 904, such as the location in which at least part of the execution took place; and so forth. Step 1006 may verify that the temporal and/or spatial information is consistence with other available data, is within an expected range, obey some given rules, and so forth.

In some examples, the one or more responses may comprise information related to data sources accessed and/or used in the generation of at least part of the responses. For example, the responses may comprise identifying information related to a data source, identifying information related to a state of a data source, a copy of at least part of the information obtained from the data source, and so forth. Step 1006 may verify that the expected data source was used, that the information regarding the data source is consistence with other and/or previous information regarding the data source, that the same data source was used in the generation of different responses, and so forth. In some examples, the one or more responses may comprise a reference to and/or information related to a public database and/or a blockchain accessed and/or used in the generation of at least part of the responses. For example, the responses may comprise identifying information related to the public database and/or blockchain, identifying information related to a state of the public database and/or blockchain, a copy of at least part of the information obtained from the public database and/or blockchain, and so forth. Step 1006 may verily that the expected public database and/or blockchain was used, that the information regarding the public database and/or blockchain is consistence with the public database and/or blockchain, that the same public database and/or blockchain was used in the generation of different responses, and so forth.

In some examples, the one or more responses may comprise information related to an instance and/or a version of information accessed and/or used in the generation of at least part of the responses. For example, the responses may comprise data derived from the information, a copy of at least part of the information, and so forth. Step 1006 may verify that the expected instance and/or version of information was used, that the information regarding the instance and/or version of information is consistent with other and/or previous information regarding the instance and/or version of information, that the same instance and/or version of information was used in the generation of different responses, and so forth. In some cases, the instance and/or version of information may be a committed instance and/or a committed version of information. In such cases, Step 1006 may further verify the validity of the committed instance and/or the committed version of information, for example using cryptographic tools.

In some example, the one or more responses may comprise one or more ZKPs, such as ZKPs generated by Step 904. Step 1006 may verify the validity of the ZKPs, for example using cryptographic tools. In some examples, at least one of the ZKPs may deal with a state of a data source, the content of a data source, the content of an instance and/or a version of information, the content of a committed instance and/or a committed version of information, the code used to execute process 900 and/or Step 904, the content of a public database and/or blockchain accessed by Step 904, and so forth. Step 1006 may verify information related to the above states and/or contents using the ZKPs.

In some examples, one entity may loan money from another entity, using tangible properties as collaterals. Some examples of such tangible properties may include: cars, airplanes, ships, real estate, inventory, and so forth. The lender may wish to obtain a report regarding the state and condition of the collaterals, with or without a current estimated value, but may not have access to such information. The borrower may have access to information regarding the collaterals, but may not want to share such information with the lender, for example due to privacy issues, due to regulations, due to legal obligations, and so forth. In such example, the borrower may provide information regarding the state and condition of the collaterals without sharing the raw information with the lender, for example using process 900. For example, as a non-limiting example, assume entity 621 may loan money from entity 624, and that at least part of the information regarding the collaterals is contained within data sources 631 and 632. For example, data source 632 may contain maintenance records produced by entity 622, and data source 631 may contain ownership records. Entity 624 do not have access to data sources 631 and 632, but may generate a query to process 900 executed by entity 621 using Step 1002 of process 1000. Process 900 at entity 621 may generate a sufficient proof regarding the state and/or current evaluation of the collaterals using Step 904, and provide the proof to process 1000 at entity 624 using Step 906, Process 1000 at entity 624 may receive the proof using Step 1004, and validate the proof using Step 1006. In Step 1006, entity 624 may validate the code used to generate the proof, the data source inspected in the generation of the proof, the calculated evaluation, and so forth.

Figure 11:
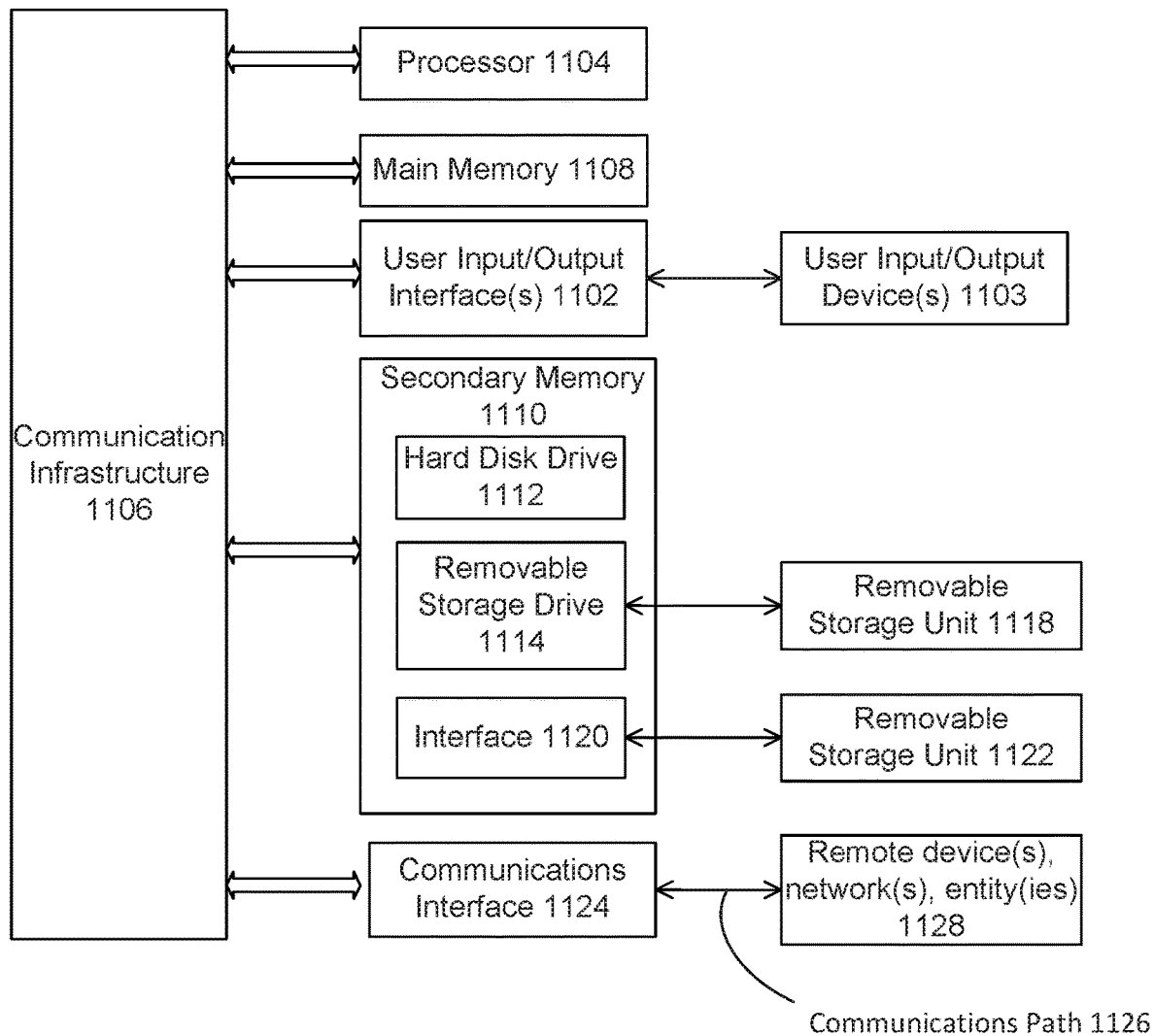
FIG. 11 depicts an example computer system useful for implementing various embodiments.

FIG. 11 depicts an example computer system useful for implementing various embodiments.

Various embodiments may be implemented, for example, using one or more well-known computer systems, such as computer system 1100 shown in FIG. 11. One or more computer systems 1100 may be used, for example, to implement any of the embodiments discussed herein, as well as combinations and sub-combinations thereof.

Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, keyboards, pointing devices, etc., which may communicate with communication infrastructure 606 through user input/output interface(s) 1102.

One or more of processors 1104 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 may also include a main or primary memory 608, such as random access memory (RAM). Main memory 1108 may include one or more levels of cache. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 may include a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described herein.

In some embodiments, a first function result generated based on a first underlying data may be received. Further, a first proof that verifies the accuracy of the first function result without needing to reveal the first underlying data may be received. For example, the first proof may comprise a ZKP. Further, a first value derived from a one-way cryptographic operation performed using the first function result and/or a two-way encryption operation performed using the first function result and/or a multi-way encryption operation performed using the first function result may be received. In some examples, the first function result, the first proof, and/or the first value may be received from a preceding proof system. In some examples, the first function result, the first proof, and/or the first value may be received through digital communication network, communication infrastructure 1106, etc. for example using a communication device such as communication interface 1124. In some examples, the first function result, the first proof, and/or the first value may be read from memory, obtained from a remote electronic device (such as a web server, a computerized device, etc.), and so forth. In some examples, the first function result, the first proof, and/or the first value may be obtained from a blockchain.

A second function result may be evaluated based at least in part on the first function result and a second underlying data. For example, a changeable business logic function may be applied to the first function result and the second underlying data to evaluate the second function result. In another example, a selected computer function may be used to evaluate the second function result from the first function result and the second underlying data.

Further, a second value may be generated based on the second function result using another one-way cryptographic operation and/or another two-way encryption operation and/or another multi-way encryption operation. Further, a second proof based on the second value may be generated such that the second proof enables a verification of accuracy of the second function result without needing to reveal the second underlying data. For example, the second proof may include a ZKP.

In some examples, the second proof and/or the second value may be published. For example, the second proof and/or the second value may be transmitted through digital communication network, communication infrastructure 1106, etc. for example using a communication device such as communication interface 1124. In some examples, the first function result, the first proof, and/or the first value may be stored in memory, provided to a remote electronic device (such as a web server, a computerized device, etc.), and so forth. In some examples, the second proof and/or the second value may be published on a blockchain.

In one example, the first function result may comprise carry data and the second function result may comprise an updated version of the carry data based on the second underlying data. In another example, the second function result may be independent of the first function result. In some examples, each of the first value and/or the second value may comprise a glue value. For example, the first value and the second value may each comprise at least one glue value, and the first proof and the second proof may be iteratively verified using the glue values.

In some examples, a third proof may be generated in parallel with generating the second proof, and the third proof may be based, at least in part, on a third function result generated from a third underlying data. Further, a witness may be prepared in a preprocessing step to enable the second proof and the third proof to be generated in parallel.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
   receiving a first function result generated based on a first underlying data;
   receiving a first proof that verifies accuracy of the first function result without needing to reveal the first underlying data;
   receiving a first value wherein the first value is derived from at least one of a one-way cryptographic operation performed using the first function result, a two-way encryption operation performed using the first function result, and a multi-way encryption operation performed using the first function result;
   evaluating a second function result based at least in part on the first function result and a second underlying data;
   generating a second value based on the second function result and the first value using at least one of another one-way cryptographic operation, another two-way encryption operation, and a multi-way encryption operation;
   generating a second proof based on the second value such that the second proof enables a verification of accuracy of the second function result without needing to reveal the second underlying data; and
   publishing the second proof and the second value.

2. The computer-implemented method of claim 1, wherein evaluating the second function result further comprises:
   applying a changeable business logic function to the first function result and the second underlying data.

3. The computer-implemented method of claim 1, wherein the first function result is carry data and wherein the second function result is an updated version of the carry data based on the second underlying data.

4. The computer-implemented method of claim 1, wherein the first value and second value are glue values.

5. The computer-implemented method of claim 4, further comprising:
   iteratively verifying the first proof and the second proof using the glue values.

6. The computer-implemented method of claim 1, further comprising:
   generating a third proof in parallel with generating the second proof, wherein the third proof is based on a third function result generated from a third underlying data.

7. The computer-implemented method of claim 6, further comprising:
   preparing a witness in a preprocessing step to enable the second proof and the third proof to be generated in parallel.

8. The computer-implemented method of claim 1, wherein the publishing further comprises:
   publishing the second proof and the second value to a blockchain.

9. A system, comprising:
   a memory; and
   at least one processor coupled to the memory and configured to:
   receive a first function result generated based on a first underlying data;
   receive a first proof that verifies accuracy of the first function result without needing to reveal the first underlying data;
   receive a first value wherein the first value is derived from at least one of a one-way cryptographic operation performed using the first function result, a two-way encryption operation performed using the first function result, and a multi-way encryption operation performed using the first function result;
   evaluate a second function result based at least in part on the first function result and a second underlying data;
   generate a second value based on the second function result and the first value using at least one of another one-way cryptographic operation, another two-way encryption operation, and another multi-way encryption operation;
   generate a second proof based on the second value such that the second proof enables a verification of accuracy of the second function result without needing to reveal the second underlying data; and
   publish the second proof and the second value.

10. The system of claim 9, wherein to evaluate the second function result, the at least one processor is further configured to:
    apply a changeable business logic function to the first function result and the second underlying data.

11. The system of claim 9, wherein the first function result is carry data and wherein the second function result is an updated version of the carry data based on the second underlying data.

12. The system of claim 9, wherein the first value and second value are glue values.

13. The system of claim 9, wherein the at least one processor is further configured to:
    generate a third proof in parallel with generating the second proof, wherein the third proof is based on a third function result generated from a third underlying data; and
    prepare a witness in a preprocessing step to enable the second proof and the third proof to be generated in parallel.

14. The system of claim 9, wherein to publish the second proof and the second value, the at least one processor is further configured to:
    publish the second proof and the second value to a blockchain.

15. A non-transitory computer-readable device having instructions stored thereon that, when executed by at least one computing device, cause the at least one computing device to perform operations comprising:
 receiving a first function result generated based on a first underlying data;
 receiving a first proof that verifies accuracy of the first function result without needing to reveal the first underlying data;
 receiving a first value wherein the first value is derived from at least one of a one-way cryptographic operation performed using the first function result, a two-way encryption performed using the first function result, and a multi-way encryption performed using the first function result;
 evaluating a second function result based at least in part on the first function result and a second underlying data;
 generating a second value based on the second function result and the first value using at least one of another one-way cryptographic operation, another two-way encryption operation, and another multi-way encryption operation;
 generating a second proof based on the second value such that the second proof enables a verification of accuracy of the second function result without needing to reveal the second underlying data; and
 publishing the second proof and the second value.

16. The non-transitory computer-readable device of claim 15, where to evaluate the second function result, the operations further comprise:
 applying a changeable business logic function to the first function result and the second underlying data.

17. The non-transitory computer-readable device of claim 15, wherein the first function result is carry data and wherein the second function result is an updated version of the carry data based on the second underlying data.

18. The non-transitory computer-readable device of claim 15, wherein the first value and second value are glue values.

19. The non-transitory computer-readable device of claim 15, the operations further comprising:
 generating a third proof in parallel with generating the second proof, wherein the third proof is based on a third function result generated from a third underlying data; and
 preparing a witness in a preprocessing step to enable the second proof and the third proof to be generated in parallel.

20. The non-transitory computer-readable device of claim 15, wherein to publish the second proof and the second value, the operations further comprise:
 publishing the second proof and the second value to a blockchain.

* * * * *